(12) United States Patent
Kang et al.

(10) Patent No.: US 12,388,798 B2
(45) Date of Patent: Aug. 12, 2025

(54) ELECTRONIC DEVICE FOR PERFORMING ENCRYPTED COMMUNICATION, AND OPERATION METHOD THEREOF

(71) Applicant: Samsung Electronics Co., Ltd., Gyeonggi-do (KR)

(72) Inventors: Byungsung Kang, Gyeonggi-do (KR); Moohyun Shin, Gyeonggi-do (KR); Jeonghyeon Yun, Gyeonggi-do (KR); Dongsun Lim, Gyeonggi-do (KR); Changseob Kim, Gyeonggi-do (KR); Taehwan Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 17/732,586

(22) Filed: Apr. 29, 2022

(65) Prior Publication Data

US 2022/0255908 A1 Aug. 11, 2022

Related U.S. Application Data

(63) Continuation of application No. PCT/KR2020/014926, filed on Oct. 29, 2020.

(30) Foreign Application Priority Data

Oct. 29, 2019 (KR) .................... 10-2019-0135901

(51) Int. Cl.
*H04L 9/40* (2022.01)
*H04W 4/80* (2018.01)
*H04W 76/14* (2018.01)

(52) U.S. Cl.
CPC .......... *H04L 63/0428* (2013.01); *H04W 4/80* (2018.02); *H04W 76/14* (2018.02)

(58) Field of Classification Search
None
See application file for complete search history.

(56) References Cited

U.S. PATENT DOCUMENTS 10,613,213 B2 * 4/2020 Silverstein ............ G01S 13/87
11,606,838 B2 * 3/2023 Han ..................... H04W 8/005
(Continued)

FOREIGN PATENT DOCUMENTS

KR 20120050368 A 5/2012
KR 10-2015-0055851 A 5/2015
(Continued)

OTHER PUBLICATIONS

Korean Office Action dated Apr. 21, 2025.

*Primary Examiner* — Pablo N Tran
(74) *Attorney, Agent, or Firm* — Cha & Reiter, LLC.

(57) ABSTRACT

Electronic devices are disclosed, including a first and second device. The first device includes a communication circuit, and a processor. The processor is configured to receive a first signal from the second device, identify a present mode of the second device, based on the received first signal, establish a communicative connection with the second device, based on identifying that the second device is operating in a first mode, in response to establishing the connection, generate first information for inclusion in a second signal to be periodically transmitted from the second device which transitions to a second mode, and second information for encrypting communications with the second device, and transmit the first information and the second information to the second device, and a second device different from the second device.

20 Claims, 21 Drawing Sheets

(56) References Cited

U.S. PATENT DOCUMENTS

| | | | | |
|---|---|---|---|---|
| 11,622,243 | B2* | 4/2023 | Burowski | H04W 76/40 |
| | | | | 455/41.2 |
| 11,647,111 | B2* | 5/2023 | Cheong | H04M 1/72403 |
| | | | | 455/566 |
| 11,671,806 | B2* | 6/2023 | Kang | H04W 76/14 |
| | | | | 370/329 |
| 11,716,590 | B2* | 8/2023 | Sankaran | H04W 4/023 |
| | | | | 455/456.1 |
| 11,765,148 | B2* | 9/2023 | Zhang | G06K 7/1417 |
| | | | | 713/171 |
| 11,943,079 | B2* | 3/2024 | Cheong | H04W 40/24 |
| 11,997,496 | B2* | 5/2024 | Fornshell | H04W 12/61 |
| 12,028,164 | B2* | 7/2024 | Cheong | H04W 76/11 |
| 2015/0134743 | A1 | 5/2015 | Heo et al. | |
| 2016/0278151 | A1 | 9/2016 | Kwon et al. | |
| 2017/0231016 | A1 | 8/2017 | Park et al. | |
| 2018/0199176 | A1 | 7/2018 | Srivatsa et al. | |
| 2018/0376528 | A1 | 12/2018 | Lee et al. | |
| 2020/0068371 | A1* | 2/2020 | Lowe | H04W 4/60 |
| 2023/0056166 | A1* | 2/2023 | Linsky | H04W 12/037 |
| 2024/0430092 | A1* | 12/2024 | Shrivastava | H04L 9/3213 |

FOREIGN PATENT DOCUMENTS

| | | |
|---|---|---|
| KR | 10-1603160 B1 | 3/2016 |
| KR | 10-2019-0001468 A | 1/2019 |

* cited by examiner

ELECTRONIC DEVICE FOR PERFORMING ENCRYPTED COMMUNICATION, AND OPERATION METHOD THEREOF

CROSS-REFERENCE TO RELATED APPLICATION(S)

This application is continuation of International Application No. PCT/KR2020/014926, filed on Oct. 29, 2020, which claims priority to Korean Patent Application No. 10-2019-0135901 filed on Oct. 29, 2019 in the Korean Intellectual Property Office, the disclosures of which are herein incorporated by reference.

BACKGROUND

Technical Field

Certain embodiments of the disclosure relate to remote access and control of external electronic devices, and, more particular, to adding encrypted security to the remote access and control operations.

Description of Related Art

Portable digital communication devices have become a necessity for contemporary consumers. Consumers desire access to a variety of high-quality digital services, with portable allowing access to those services irrespective of time or location.

A device control service using short-range communication may allow portable digital communication devices to control other devices located within a specified distance range. In order to provide the device control service, the portable digital communication devices may include communication circuits for short-range communication with other devices, and may thus control the communication circuits to transceive data with the other devices.

To ensure the device control service has a sufficient degree of security, it is desirable to implement access right control when performing short-range communications with other devices.

To control a target device (e.g., such as a BLE device) or identify a state of the target device, other electronic devices may be in communication with the target device. The target device may be in communication so as to be controlled by the connected electronic devices, thereby providing remote access to a particular service (e.g., activation or deactivation of lighting) for a user of the electronic device(s). However, because the target device is indiscriminately controlled by various electronic devices, some or all of which may actually be unauthorized to access the target device, a problem may occur in that the target device does not operate as intended by the authorized user of the target device. Moreover, since information related to the target device is transceived indiscriminately by various electronic devices (including unauthorized devices), there is a risk of exposing the user's information to illicit access.

In addition, when an access right to the target device is actively restricted, establishing control of the target device may involve determining security authorization for each accessing device, thereby increasing operational load. In particular, when the target device supports short-range communication without supporting long-range communication (e.g., Internet communication), protocols for sharing secure information of the target device with accessing devices may be non-extant or underdeveloped.

SUMMARY

According to certain embodiments, an electronic device may generate information indicating whether the electronic device is authorized to control a target device, and communicably connect to the target device based on the generated information, thereby preventing the target device from operation by unauthorized controller devices. Further, according to certain embodiments, the electronic device may establish encryption for the target device, and encrypt transceived data for the target device based on the information, thereby increasing security of information for remote control of the target device. Further, according to certain embodiments, as the electronic device limits the granting of access rights to the target device to electronic devices of other authorized controllers, operational loads for establishing such control may be reduced.

According to certain embodiments, an electronic device includes: a communication circuit; a memory configured to store instructions; and at least one processor communicatively coupled to the communication circuit and the memory, wherein the instructions are executable by the at least one processor to cause the electronic device to: receive a first signal from a first external device, via the communication circuit, identify a present mode of the first external device, based on the received first signal, control the communication circuit to establish a communicative connection with the first external device, based on identifying that the first external device is operating in a first mode, in response to establishing the connection, generate first information for inclusion in a second signal to be periodically transmitted from the first external device operating in a second mode, and second information for encrypting communications with the first external device, and control the communication circuit to transmit the first information and the second information to the first external device, and a second external device different from the first external device.

According to certain embodiments, an electronic device includes: processor communicatively coupled to the communication circuit and the memory, wherein the instructions are executable by the at least one processor to cause the electronic device to: control the communication circuit to periodically transmit a first signal, connect to a first external device, via the communication circuit, based at least in part on the transmitted first signal, receive first information and second information for encrypted communication from the connected first external device via the communication circuit, periodically transmit a second signal including the first information, based on the received first information and second information, establishing a connection to a second external device, based on the transmitted second signal, via the communication circuit, and transceive data with the connected first external device, based on the second information.

According to certain embodiments, an electronic device may include a communication circuit, a memory configured to store instructions, and at least one processor configured to execute the instructions stored in the memory. The instructions may be configured to cause the at least one processor to control the communication circuit to periodically transmit a first signal, control the communication circuit to connect to a first external device based on the transmitted first signal, control the communication circuit to receive first information, and second information for encrypted communication from the connected first external device, control the communication circuit to periodically transmit a second signal including the first information, based on the receiving the first information and the second information, control the communication circuit to connect to a second external device located within a specified distance, based on the transmitted second signal, and control the communication circuit to transmit data to or receive data from the connected first external device based on the second information.

According to certain embodiments, the technical solutions are not limited to the above-described solutions, and those skilled in the art will clearly understand solutions not mentioned from the specification and the accompanying drawings.

DETAILED DESCRIPTION

Figure 1:
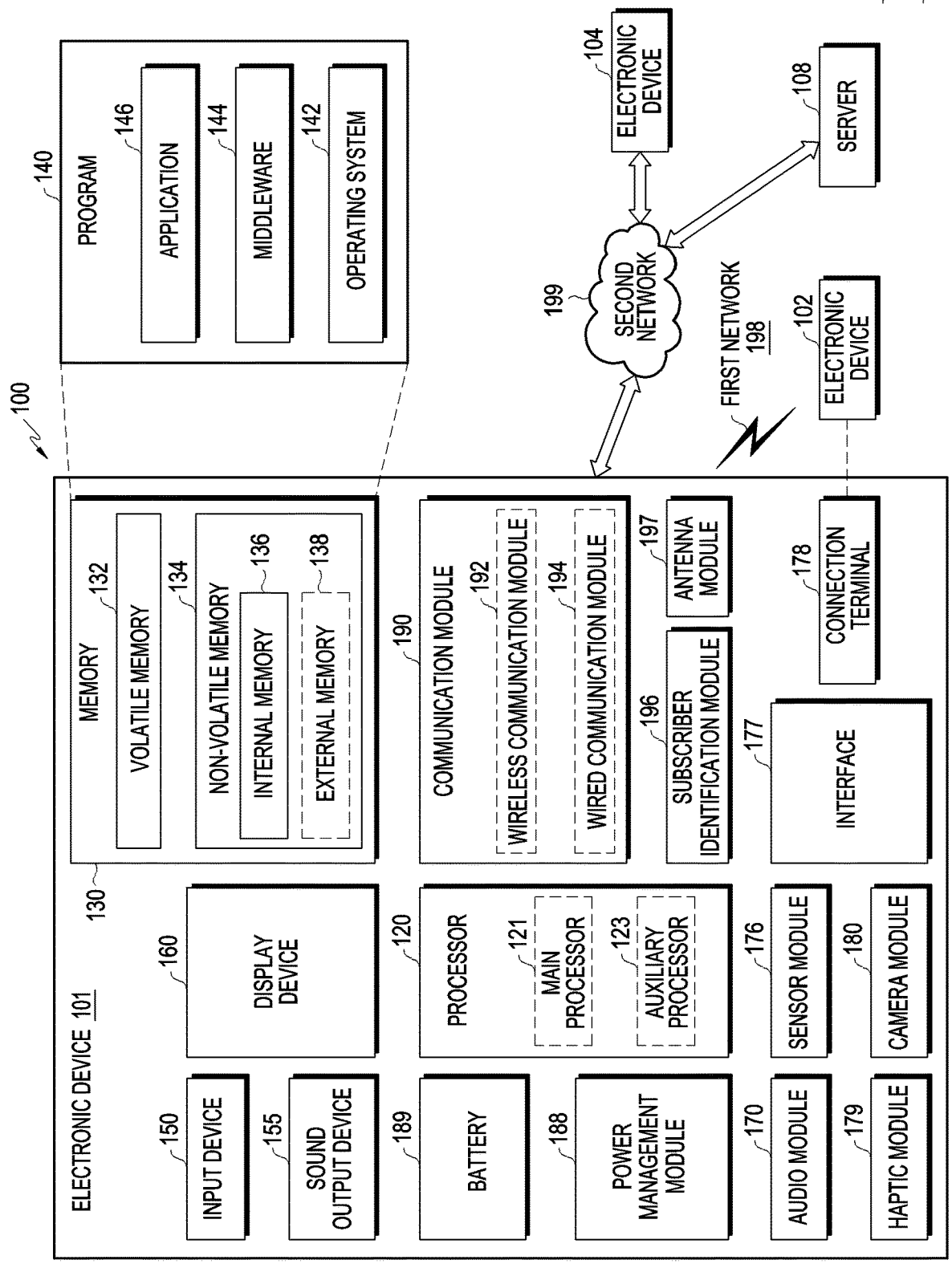
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be avoided from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be avoided, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or avoided, or one or more other operations may be added.

An example of a system will be described below.

According to certain embodiments, the system may include a plurality of electronic devices, at least one target device, and a server. The description of devices in the network environment 100 may be applied adaptively to the plurality of electronic devices, the at least one target device, and the server included in the system.

Figure 2:
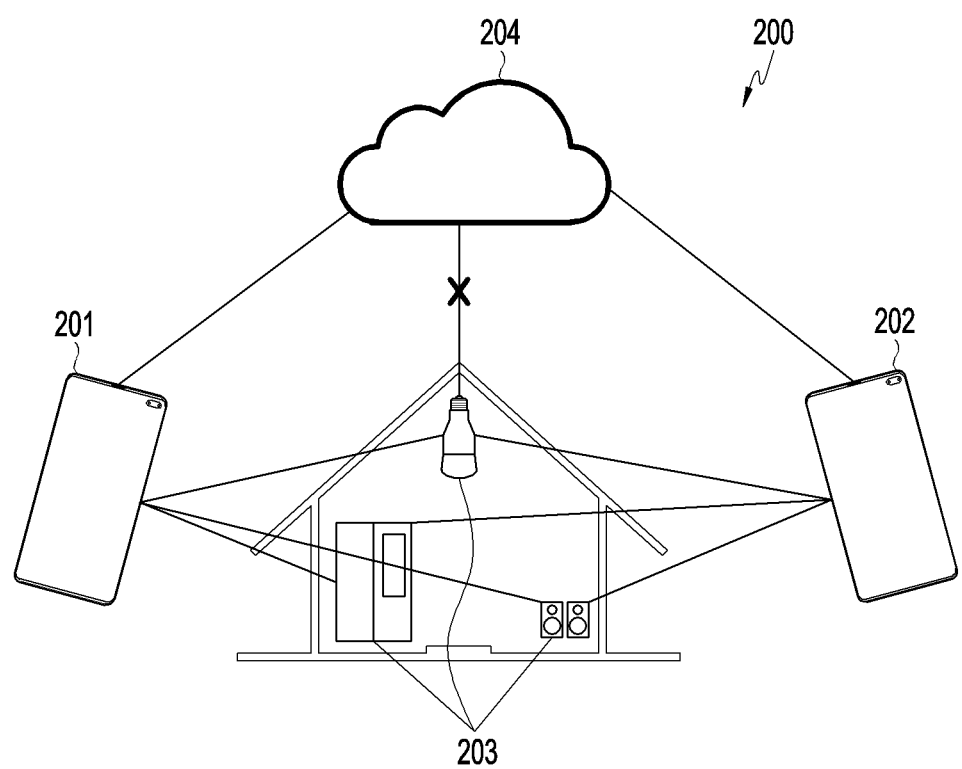
FIG. 2 is a diagram illustrating an example system according to certain embodiments.

FIG. 2 is a diagram illustrating an example system 200 according to certain embodiments.

A plurality of electronic devices 201 and 202 will be described below.

According to certain embodiments, at least one of the plurality of electronic devices 201 and 202 may be connected to at least one target device 203 to identify the state of the at least one target device 203 (e.g., identify (or read) a state value of a specific service of the target device 203) or control the state of the at least one target device 203 (e.g., change (or write) the state value of the specific service of the target device 203).

According to certain embodiments, at least one of the plurality of electronic devices 201 and 202 may control a communication circuit (e.g., a BLE communication circuit) to perform pairing with the at least one target device 203, and generate information for encrypted communication based on performing the pairing. Further, at least one of the plurality of electronic devices 201 and 202 may directly obtain information for encrypted communication with the at least one target device 203, which has been generated from another device, for example, from the server 204 or from another device, and perform encrypted communication to control the at least one target device 203 based on the obtained information.

The at least one target device 203 will be described below.

According to certain embodiments, the at least one target device 203 may be implemented to provide at least one service. For example, the at least one target device 203 may be various home appliances including a light bulb, an audio device, a refrigerator, and so on. However, without being limited to the above description, the target device 203 may be remotely controlled by another device, or may be any of various types of devices capable of providing sensed information to another device. The at least one target device 203 may include a memory, a processor, and a communication circuit to provide at least one service. Since the memory, the processor, and the communication circuit may be implemented identically to the memory, the processor, and the communication module implemented in the above-described network environment 100, a redundant description will be omitted.

According to certain embodiments, the at least one target device 203 may transmit/receive data to/from the plurality of electronic devices 201 and 202 within a short range.

For example, the at least one target device 203 may include a communication circuit supporting short-range communication (hereinafter, referred to as a short-range communication circuit) as the communication circuit, and transmit/receive data to/from devices within a specified distance (e.g., a specified distance based on a short-distance communication scheme supported by the communication circuit). The short-range communication circuit may include a communication circuit supporting Bluetooth communication or a communication circuit supporting BLE communication.

In addition, the at least one target device 203 may perform broadcasting, pairing, and communication connection based on a communication scheme supported by the short-range communication circuit by using the short-range communication circuit. For example, the at least one target device 203 may periodically broadcast a signal receivable at devices within the specified range from the at least one target device 203. The at least one target device 203 may receive pairing requests from other devices, and generate information (e.g., a short-term key and a long-term key) for encryption of communication connections. That is, the at least one target device 203 may perform pairing for encryption of a communication connection before establishment of the communication connection. The at least one target device 203 may establish communication connections with the other devices after pairing, and transmit/receive encrypted data by using information for encryption of the communication connections with the other devices.

According to certain embodiments, the at least one target device 203 may not include a long-range communication circuit (or long-range communication module) for establishing communication (e.g., Wifi, WLAN, and so on) with a remote electronic device. In other words, the at least one communication circuit included in the at least one target device 203 may include a first communication circuit supporting short-range communication without a second communication circuit supporting a long-range communication circuit.

According to certain embodiments, the at least one target device 203 may be set to different modes. The different modes may include a setup mode and an operation mode. The setup mode may refer to a mode in which information (e.g., an adv ID) generated based on pairing with another device is not included in a signal periodically transmitted from the at least one target device 203. The operation mode may refer to a mode in which the information (e.g., the adv ID) generated based on the pairing with another device is included in a signal periodically transmitted from the at least one target device 203. That is, other electronic devices may identify the mode of the at least one target device 203 according to whether a signal output from the target device 203 includes specific information.

The server 204 will be described below.

According to certain embodiments, the server 204 may store various types of information related to communication connections between the plurality of electronic devices 201 and 202 and the at least one target device 203. For example, the server 204 may receive and store information generated during establishment of communication connections between at least some of the plurality of electronic devices 201 and 202 and the at least one target device 203. The at least some of the plurality of electronic devices 201 and 202 may register the generated information in the server 204. For example, the generated information may include information (e.g., an adv ID) for signal transmission, information (e.g., a symmetric key) for communication encryption, and various types of additional information (e.g., contextual information including location information, time information, and so on).

According to certain embodiments, the server 204 may provide the stored information (e.g., the adv ID and the symmetric key) to at least some of the plurality of electronic devices 201 and 202, which are authorized to access the stored information. For example, the server 204 may manage the information on an account basis and provide the stored information to an electronic device included in an account. In other words, information stored in association with a specific account in the server 204 is accessible to an electronic device registered in the specific account. Alternatively, the server 204 may provide information stored in association with an arbitrary account to another electronic device registered in another account allowed to share. Alternatively, the server 204 may manage information on a group basis (for a plurality of accounts) and provide the information to other electronic devices in a group. The server 204 according to certain embodiments may share registered information with an electronic device allowed to share the information, not limited to any specific sharing scheme.

An example of operations of the devices included in the system 200 according to certain embodiments will be described below. A redundant description of the above-described system 200 will be omitted herein.

According to certain embodiments, an electronic device (e.g., a first electronic device 201) may generate information for communication reconnection and encrypted communication by performing pairing with the target device 203, and transmit the generated information to another electronic device to enable the other electronic device to establish a communication connection and perform encrypted communication with the target device 203.

Figure 3:
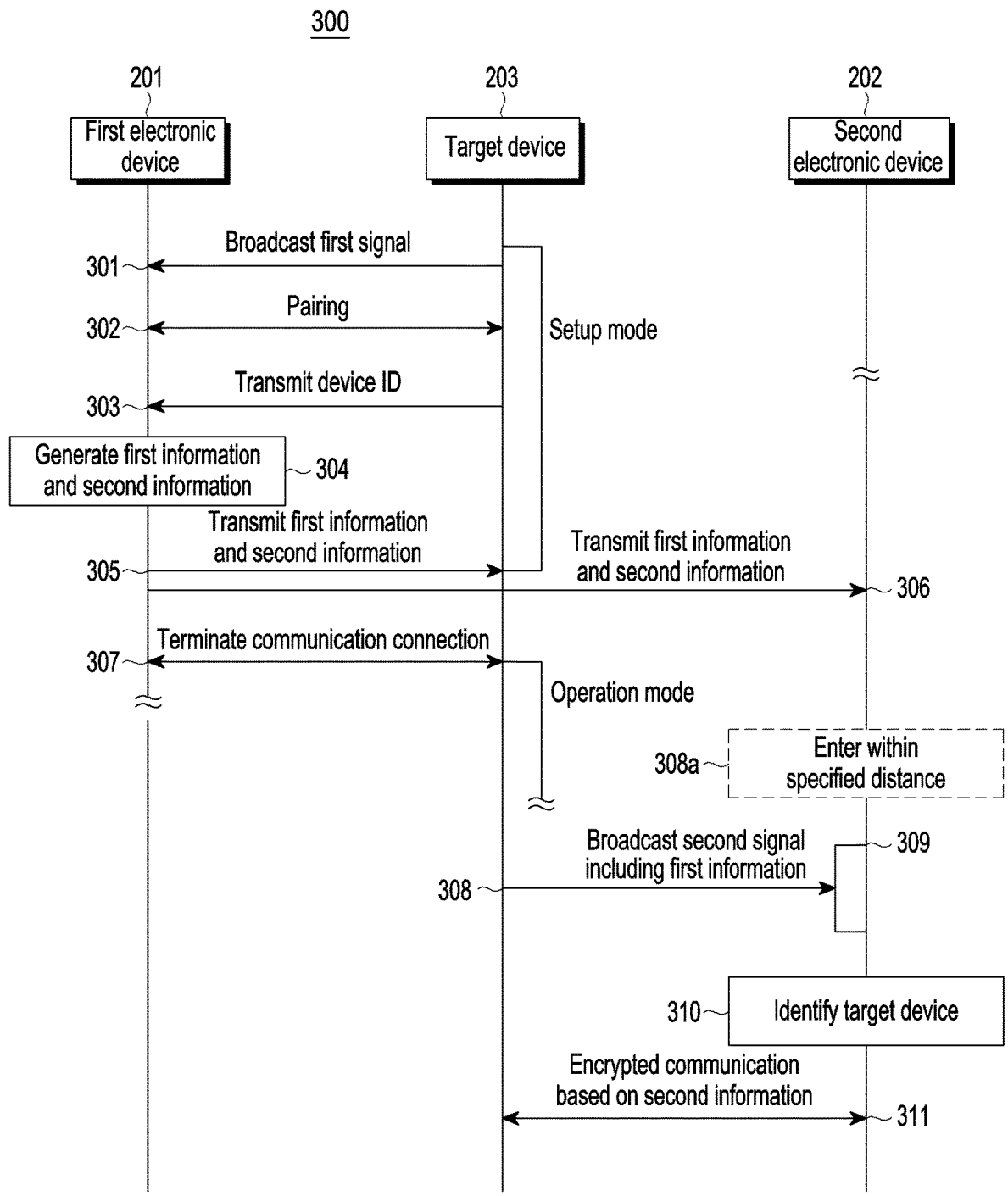
FIG. 3 is a flowchart illustrating an example of operations of devices included in the system according to certain embodiments.
Figure 4:
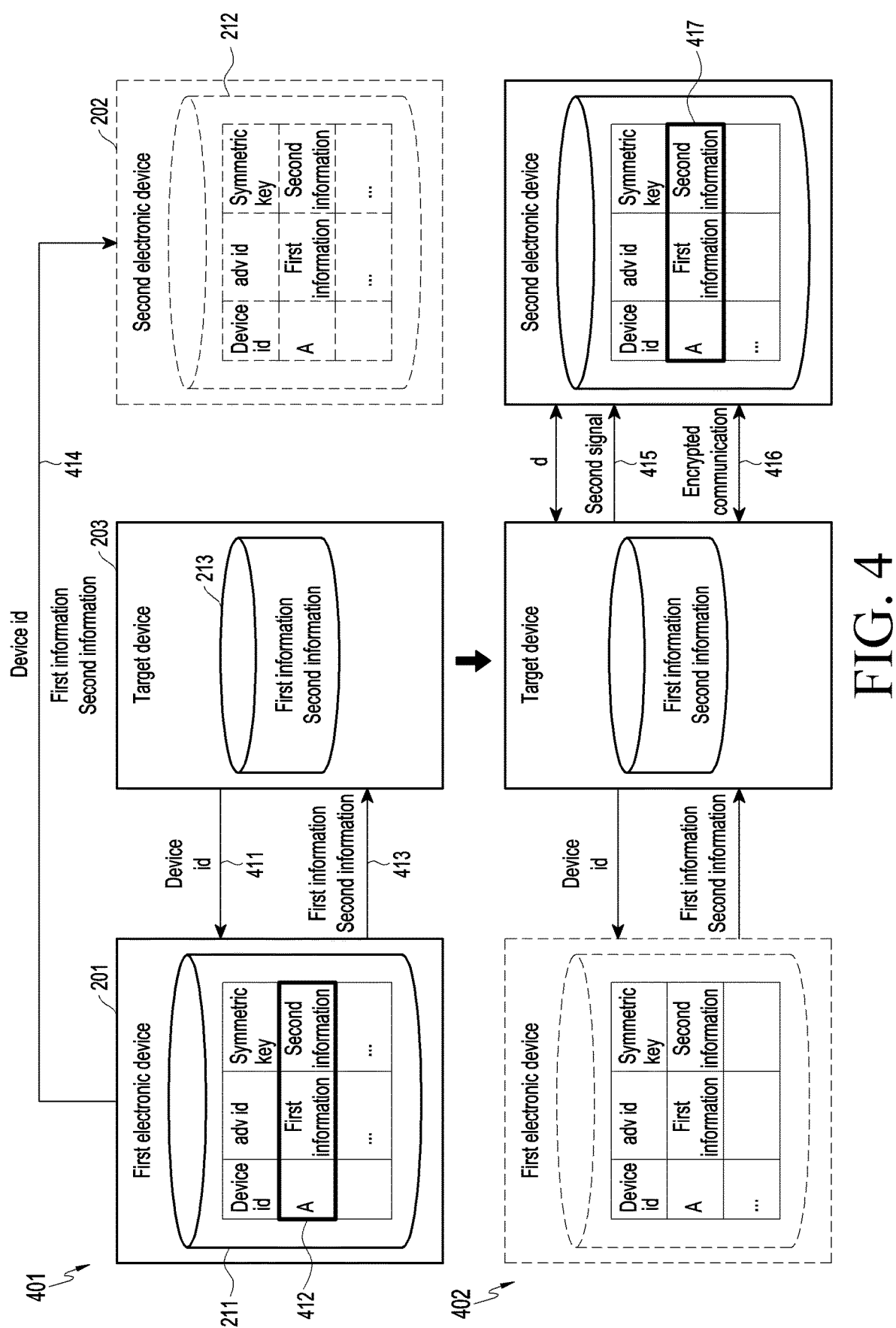
FIG. 4 is a diagram illustrating an example of operations of devices included in the system according to certain embodiments.

FIG. 3 is a flowchart 300 illustrating an example of operations of the devices included in the system 200 according to certain embodiments. According to certain embodiments, the operations of the devices included in the system 200 may be performed in an order different from the order of the operations of the devices included in the system 200 illustrated in FIG. 3, not limited to the illustrated order. Further, according to certain embodiments, more operations than or at least one operation fewer than those of the devices included in the system 200 illustrated in FIG. 3 may be performed. With reference to FIG. 4, FIG. 3 will be described below.

FIG. 4 is a diagram illustrating an example of operations of the devices included in the system 200 according to certain embodiments.

According to certain embodiments, the first electronic device 201 (e.g., at least one processor) may control the communication circuit (e.g., the BLE communication circuit) to receive a first signal broadcast from the target device 203 in operation 301.

According to certain embodiments, the target device 203 (e.g., at least one processor) may control the communication circuit (e.g., the BLE communication circuit) to periodically broadcast the first signal (e.g., an advertisement signal), announcing the existence of the target device 203. In this case, the target device 203 may be operating in the setup mode. The setup mode may be defined as a mode in which the target device 203 has not yet received or stored information (e.g., an advertisement (adv) ID to be described later) generated by a specific device through encrypted communication based on pairing with the specific electronic device. In other words, the setup mode may be defined as a mode in which the target device 203 periodically broadcasts a first signal that does not include information (e.g., the adv ID) generated by the specific device.

According to certain embodiments, when the first electronic device 201 (e.g., the at least one processor) is located within a specified distance from the target device 203, the first electronic device 201 may receive the first signal when it is periodically broadcast from the target device 203. In other words, the first signal broadcast from the target device 203 may be received by electronic devices located within a specified reception range from the target device 203.

According to certain embodiments, the first electronic device 201 (e.g., the at least one processor) may perform a pairing operation with the target device 203 based on the received first signal in operation 302. For example, the first electronic device 201 may scan for pairable devices using the short-range communication circuit (e.g., the communication circuit supporting BLE communication). When the first electronic device 201 receives the first signal during the scanning, the first electronic device 201 may identify the target device 203. For example, the first electronic device 201 may transmit a response signal (e.g., a connection request signal) corresponding to the first signal to the target device 203, and may establish communication with the target device 203 (e.g., be paired with the device) based on the transmission/reception of the first signal and the response signal.

According to certain embodiments, the first electronic device 201 (e.g., the at least one processor) may identify information included in the received first signal, and identify that the target device 203 is in a first mode (e.g., the setup mode). For example, when identifying that the first signal does not include information about a specified ID (e.g., information on the adv ID), the first electronic device 201 may determine that the target device 203 is operating in the setup mode. Without being limited thereto, the first signal may include information indicating that the target device 203 is operating in the setup mode (e.g., an ID indicating that the target device 203 is operating in the setup mode). Accordingly, the first electronic device 201 may identify that the target device 203 is operating in the setup mode based on the identification of the first signal including the information indicating the setup mode.

According to certain embodiments, as illustrated in 401 of FIG. 4, the first electronic device 201 (e.g., the at least one processor) may receive 411 a device ID from the target device 203 in operation 303, and generate first information and/or second information in operation 304. The device ID may be information identifying the target device 203. Operation 303 of receiving 411 the device ID from the target device by the first electronic device may be omitted, and instead, the first electronic device 201 may autonomously generate the device ID identifying the target device. For example, the first electronic device 201 may generate the device ID according to a user input. For example, in response to performing pairing with the target device 203, the first electronic device 201 may display an interface for receiving the device ID (e.g., a nickname) identifying the target device 203, and receive an input of the device ID from the user through the interface. Further, for example, the first electronic device 201 may generate specific information (e.g., an identification number) as the device ID.

According to certain embodiments, the first electronic device 201 may randomly generate the first information and/or the second information based on the pairing with the target device 203. This operation will be described in detail later with reference to FIGS. 8 and 9.

According to certain embodiments, the first electronic device 201 (e.g., the at least one processor) may generate the first information and/or the second information for use in controlling the target device 203 upon detecting that a specified condition is satisfied. For example, the specified condition may include at least one of the first electronic device identifying that the target device is operating in the setup mode, the first electronic device performing pairing with the target device, or the first electronic device establishing an encrypted communication connection based on the pairing with the target device. For example, the first electronic device 201 may generate the first information and/or the second information in response to identifying that the target device 203 is operating in the setup mode. In another example, the first electronic device may generate the first information and/or the second information in response to identifying that the target device 203 is operating in the setup mode and performing pairing with the target device 203.

According to certain embodiments, the first information may be information included in a second signal (e.g., an advertisement signal) periodically broadcast from the target device 203, when the target device 203 is operating in the operation mode. Accordingly, when the other electronic device (e.g., the first electronic device 201) receiving the second signal identifies the first information from the second signal broadcast from the target device 203, the electronic device may identify the target device 203 and identify that the target device 203 is operating in the operation mode. In a specific example, the first information may be the adv ID.

According to certain embodiments, the second information may be information facilitating encrypted communication between the target device 203 and the electronic device. In other words, the second information may be information related to implementing encrypting or decrypting data (e.g., a broadcast signal, or data transmitted/received during establishment of a communication connection) transmitted/received between the target device 203 and the electronic device communicating with the target device 203. In a specific example, the second information may be a symmetric key.

According to certain embodiments, the first electronic device 201 (e.g., the at least one processor) may store 412 the generated first information and/or second information and the received device ID in the memory 211 as illustrated in 401 of FIG. 4. In this case, the first information and/or the second information may be stored 412 in the memory 211 in association with the received device ID. That is, the first information and/or the second information stored in association with the device ID may be identified as associated with the target device 203 corresponding to the device ID. Accordingly, when the first electronic device 201 performs an operation based on the first information and/or the second information, the first electronic device 201 may identify the performed operation as an operation related to the target device 203 corresponding to the device ID associated with the first information and/or the second information, and provide information related to the performed operation based on the first information and/or the second information as an operation related to the target device 203, when a specified condition is satisfied (e.g., a command to display information about the target device 203 is obtained). In a specific example, the first electronic device 201 may display information related to the target device 203 on a specific interface, which will be described in detail later with reference to FIGS. 10 and 11. According to certain embodiments, in operation 305, the first electronic device 201 (e.g., the at least one processor) may transmit 413 the first information and/or the second information to the target device 203 as illustrated in 401 of FIG. 4. For example, the first electronic device 201 (e.g., the at least one processor) may establish a communication connection with the target device 203 based on executing pairing with the target device 203, and transmit 413 the first information and/or the second information to the communication-connected target device 203. In this case, the communication connection between the first electronic device 201 and the target device 203 may be encrypted. For example, the first electronic device 201 may encrypt the first information and/or the second information based on the information (e.g., a short term key) for encryption generated based on the pairing, and transmit the encrypted first information and/or second information to the target device 203. The target device 203 may encode the received encrypted first information and/or second information based on the information for encryption, and identify the first information and/or the second information. When the target device 203 receives the first information and/or the second information, the target device 203 may store the received first information and/or second information in the memory 213, as illustrated in 401 of FIG. 4.

According to certain embodiments, the first electronic device 201 (e.g., the at least one processor) may transmit the first information, the second information, and the device ID to a second electronic device 202 using various communication circuits (e.g., the short-range communication circuit and the long-range communication circuit) in operation 306. For example, as illustrated in 401 of FIG. 4, the first electronic device 201 may transmit 414 the first information, the second information, and the device ID to the second electronic device 202 via Wi-Fi-based or cellular-based communication. Further, for example, the first electronic device 201 may transmit the first information, the second information, and the device ID to the second electronic device 202 based on various short-range D2D communication or P2P communication schemes (e.g., Wi-Fi Direct, BLE, and NFC). Alternatively, when the second electronic device 202 is remote, the first electronic device 201 may transmit the first information, the second information, and the device ID to the second electronic device 202 through the Internet (e.g., through a server). The second electronic device 202 may store the received first information and second information in association with the device ID in the memory 212.

According to certain embodiments, the first electronic device 201 (e.g., the at least one processor) may terminate the communication connection with the target device 203 in operation 307. For example, as illustrated in FIG. 4, the first electronic device 201 may move outside of a specified distance from the target device 203 permitting communication thereof, and thus the connected communication may be terminated. Further, for example, the first electronic device 201 may terminate the communication connection based on reception of a command to terminate the communication connection (e.g., a user control input for terminating the communication connection). That is, the first electronic device 201 may terminate a set-up operation of the target device 203. The termination of the set-up operation may include termination of the established pairing with the target device and the exchange of the first information and/or the second information through encrypted communication based on the pairing. The target device 203 may operate in the operation mode in response to the termination of the set-up operation of the first electronic device 201. Further, in response to the termination of the set-up operation of the first electronic device 201, the target device 203 may delete any information (e.g., the short-term key) used for encryption, generated based on the pairing.

According to certain embodiments, the second electronic device 202 (e.g., the at least one processor) may be located within a specified distance "d" from the target device 203 in operation 308*a*, as illustrated in 402 of FIG. 4. In this case, the target device 203 may not establish a communication connection or perform pairing with the other electronic device. For example, after the communication connection between the target device 203 and the first electronic device 201 may be terminated as described above, the second electronic device 202 may move within the specified distance from the target device 203.

According to certain embodiments, in operation 308, the second electronic device 202 (e.g., the at least one processor) may receive 415 a second signal (e.g., an advertisement signal) including first information broadcast from the target device 203, as illustrated in 402 of FIG. 4. In other words, the target device 203 may periodically broadcast the second signal (e.g., the advertisement signal) including the first information (e.g., the adv ID). The target device 203 may encrypt the first information by using second information (e.g., a symmetric key) and periodically broadcast the second signal including the encrypted first information.

According to certain embodiments, the second electronic device 202 (e.g., the at least one processor) may execute scanning based on the first information in operation 309, and identify the target device 203 based on the executed scanning, further based on the first information in operation 310. For example, the second electronic device 202 may execute an operation of scanning a signal including the first information based on the stored first information and second information 417. The second electronic device 202 may identify that the received second signal includes the first information based on the scanning operation, as based on the first information. The second electronic device 202 may identify the existence of the target device 203 based on the identification of the received second signal including the first information, and identify that the target device 203 is operating in the operation mode. In this case, when the first information is encrypted, the second electronic device 202 may identify the first information, by encoding the encrypted first information based on the second information stored in the second electronic device 202.

According to certain embodiments, the second electronic device 202 may perform a scanning operation based on the first information at a specified location and/or a specified time. For example, the second electronic device 202 may identify the location of the second electronic device, compare the location of the target device 203 identified based on location information about the target device 203 with the identified location of the second electronic device 202, and when the locations correspond to each other, perform a scanning operation based on the first information. Further, for example, the second electronic device 202 may identify information regarding a time at which the target device 203 is successfully detected or a time at which control over the target device 203 is established, compare a current time with the identified time information, and when the times correspond to each other, perform the scanning operation based on the first information.

Without being limited to the above description, the second electronic device 202 may perform the scanning operation based on the first information. In this case, to reduce power consumption, the second electronic device 202 may adjust a scan period based on location information or time information as described above. This operation will be described in detail later with reference to FIGS. 12 and 13.

According to certain embodiments, in operation 311, the second electronic device 202 and the target device 203 may perform second information-based encrypted communication 416 as illustrated in 402 of FIG. 4. For example, the second electronic device 202 may request a communication connection from the target device 203 based on the identification of the target device 203, and control the communication circuit (e.g., the BLE communication circuit) to establish the communication connection with the target device 203 based on the request.

For example, the second electronic device 202 (e.g., the at least one processor) may control the communication circuit (e.g., the BLE communication circuit) to transmit encrypted data based on the second information stored in the electronic device 202 (e.g., data of a characteristic value of a specific service, encrypted based on the second information) to the communication-connected target device 203. In response to receiving the data transmission from the second electronic device 202 via the communication circuit (e.g., the BLE communication circuit), the target device 203 may receive the data encrypted based on the second information from the second electronic device 202. The target device 203 may encode the data encrypted based on the second information, based on the second information stored in the target device 203, and identify the requested control function. For example, the second electronic device 202 may encrypt a signal for controlling (e.g., writing) at least one characteristic value (or state value) (e.g., on/off) of a specific service (e.g., power) among services (e.g., BLE services) that the target device 203 (e.g., a light bulb) is capable of providing, based on the second information, and control the communication circuit (e.g., the BLE communication circuit) to transmit the encrypted signal to the target device 203. The target device 203 may decrypt the received encrypted signal based on the second information, and change the at least one characteristic value or setting thereof (e.g., a light on/off control) of the specific service based on the decrypted signal.

For example, the second electronic device 202 (e.g., the at least one processor) may control the communication circuit (e.g., the BLE communication circuit) to receive the data encrypted based on the second information from the communication-connected target device 203. The second electronic device 202 may decrypt the encrypted data based on the second information, and identify the state of the target device 203 based on the decrypted data. For example, the second electronic device 202 may request (or read) at least one characteristic value (or state value) (e.g., on/off) of the specific service (e.g., power) from among the services (e.g., the BLE service) provided by the target device 203 (e.g., the light bulb), and receive an encrypted signal including the at least one characteristic value from the target device 203 in response to the request. The second electronic device 202 may decrypt the encrypted signal based on the second information, identify the at least one characteristic value (or state value) of the specific service (e.g., power) (e.g., on/off) based on the decrypted signal, and as a result, provide (e.g., display on the display) the characteristic value so that the user of the second electronic device 202 may identify the identified characteristic value.

After the communication connection between the first electronic device 201 and the target device 203 is terminated, as described before with reference to FIGS. 3 and 4, the operation of performing encrypted communication with the target device 203 by the second electronic device 202 located within the specified distance from the target device 203 may also be performed, when the first electronic device 201 is re-disposed within the specified distance from the target device 203 (i.e., after the communication connection between the first electronic device 201 and the target device 203 is terminated). The re-disposed of the first electronic device 201 within the specified distance may include broad variations of contexts, such as the first electronic device 201 being moved back into the specified distance from the target device 203 a prolonged time period after the communication terminated, as well as situation in which the first electronic device 201 briefly moves outside the specified distance from the target device 203 after the communication is terminated, and then immediately re-enters the specified distance.

As described above, as the target device 203 is controlled based on the first information (e.g., the adv ID) for identifying the existence of an appropriate authority to control the target device 203 and the second information (e.g., the symmetric key) for use in encrypting data transmitted and received during control of the target device, the target device 203 is controllable with security by an authorized controller. Further, as the first information and/or the second information is allowed to be shared with another device, operational load imposed by using the target device 203 for which an access authority is limited may be reduced.

Another example of the operation of the system 200 according to certain embodiments will be described below. A redundant description of the above-described system 200 will be omitted herein.

According to certain embodiments, an electronic device (e.g., the first electronic device 201) may generate information for communication reconnection and encrypted communication by performing pairing with the target device 203, and register the generated information in the server 204 so that the generated information may be transmitted to another electronic device (e.g., the second electronic device 202).

Figure 5:
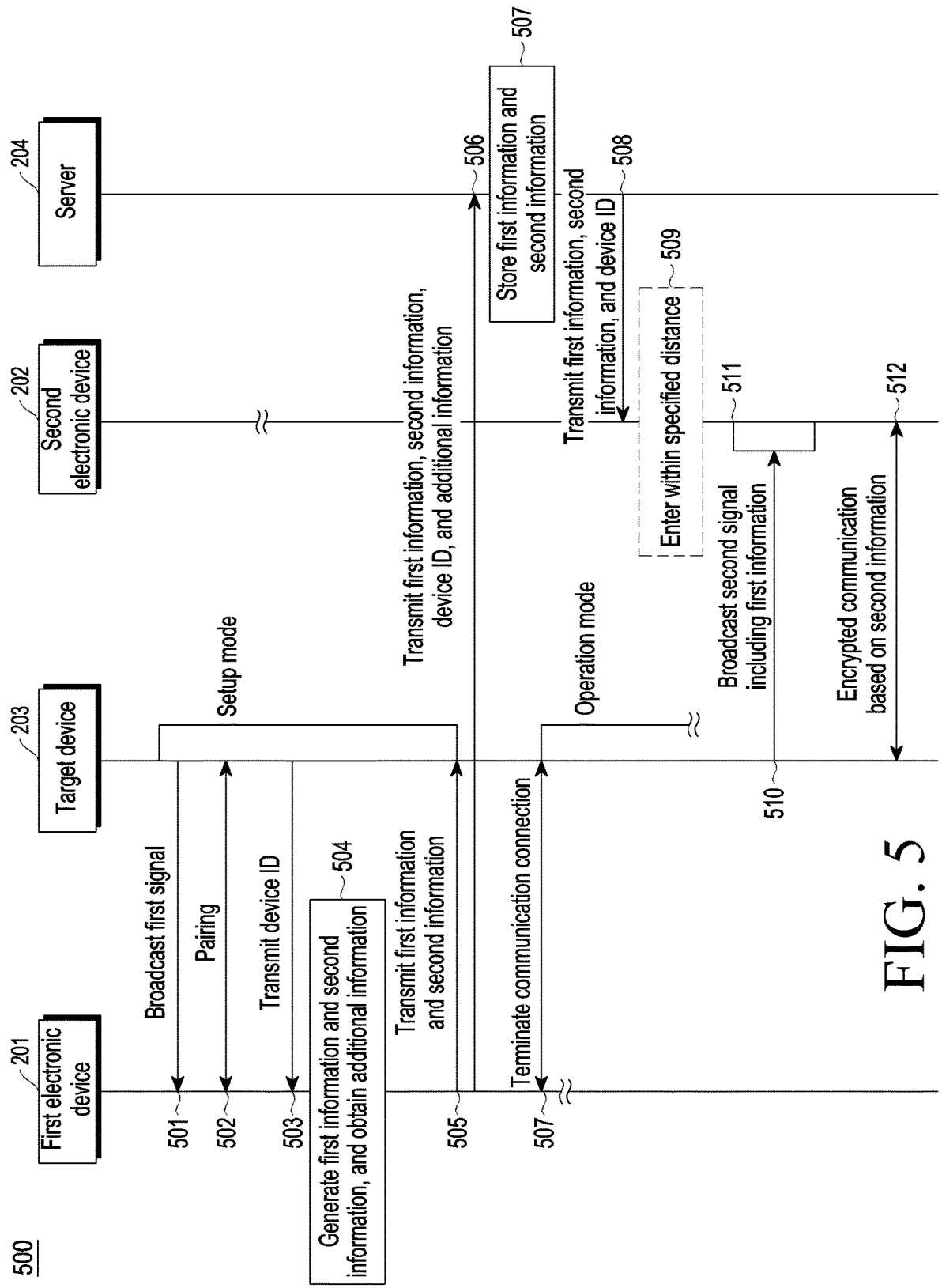
FIG. 5 is a flowchart illustrating another example operation of the system according to certain embodiments.
Figure 10:
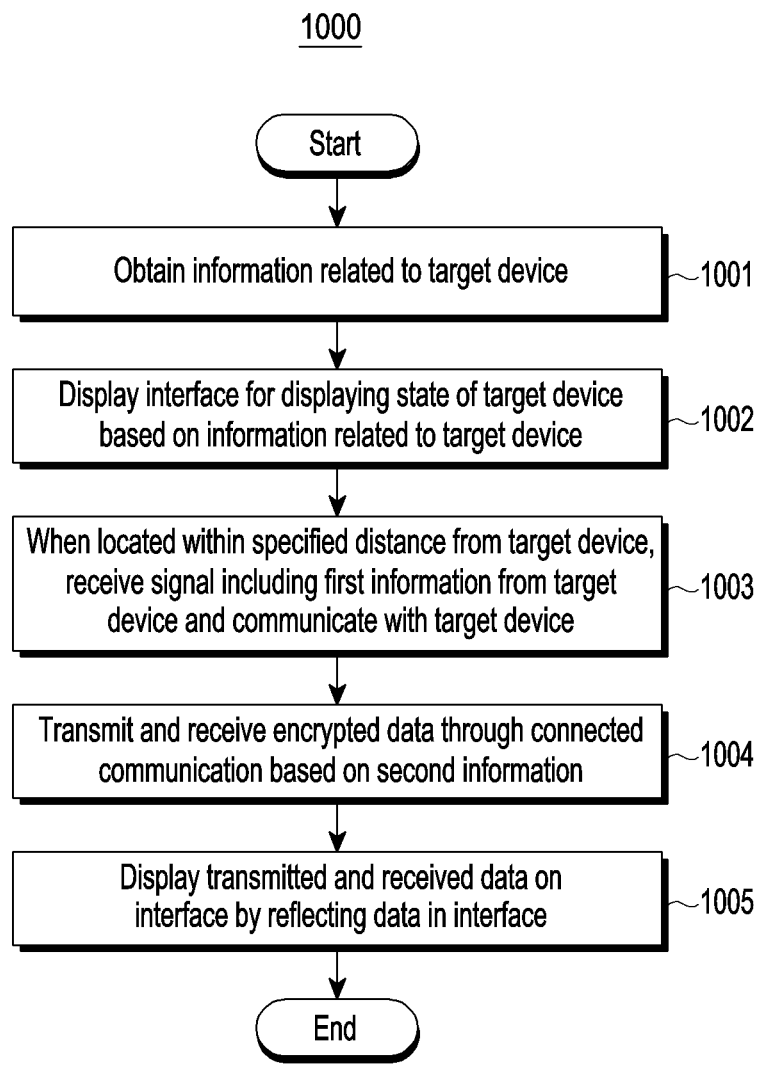
FIG. 10 is a flowchart illustrating an example operation of displaying information related to a target device in an electronic device according to certain embodiments.

FIG. 5 is a flowchart 500 illustrating another example operation of the system 200 according to certain embodiments. According to certain embodiments, the operations of the system 200 may be performed in an order different from the operation order of the system 200 illustrated in FIG. 5, not limited to the illustrated order. Further, according to certain embodiments, more operations than or at least one operation fewer than those of the system 200 illustrated in FIG. 5 may be performed. FIG. 10 will be described below with reference to FIGS. 6, 7A, and 7B.

Figure 6:
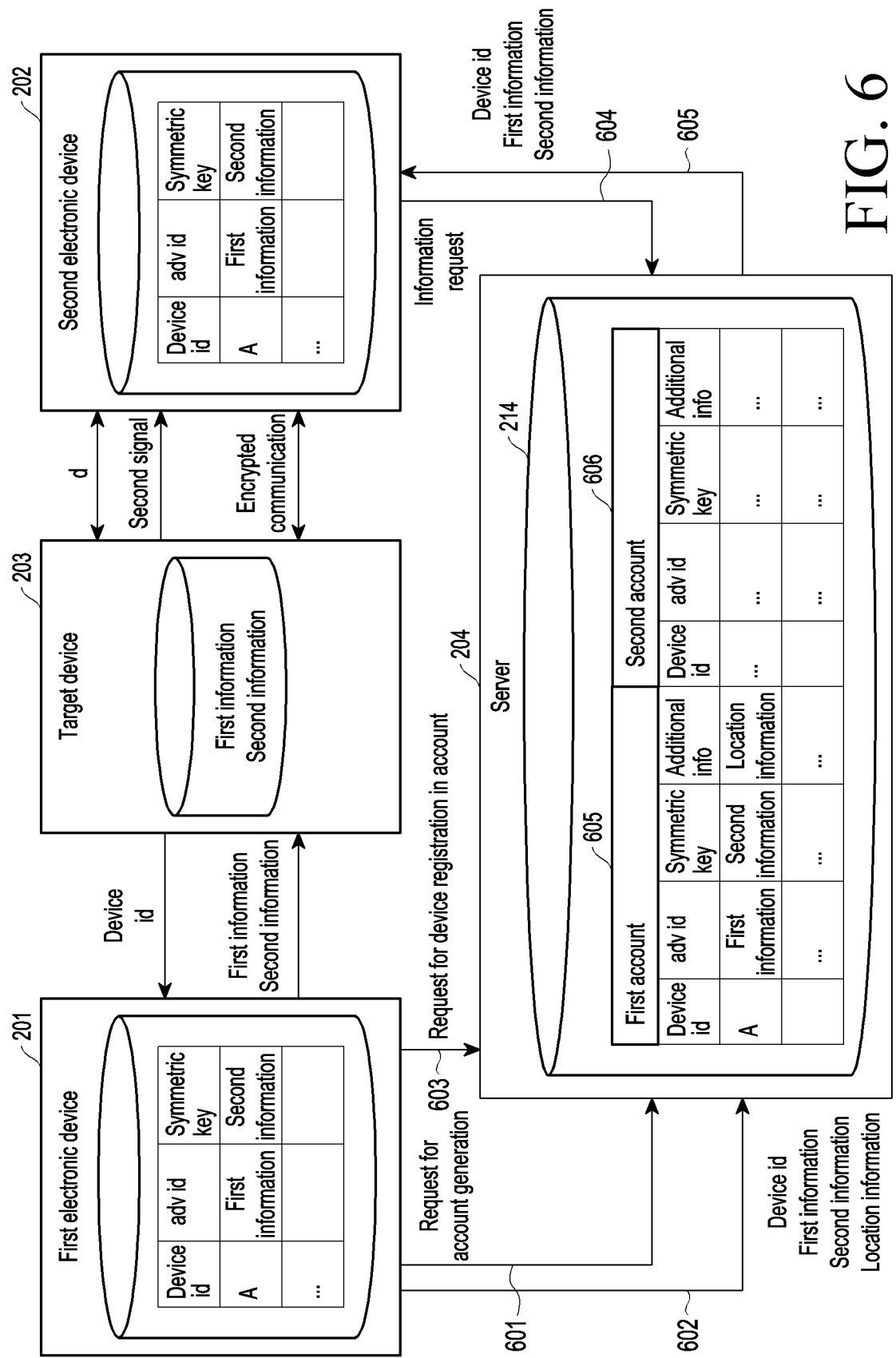
FIG. 6 is a diagram illustrating another example operation of the system according to certain embodiments.
Figure 7A:
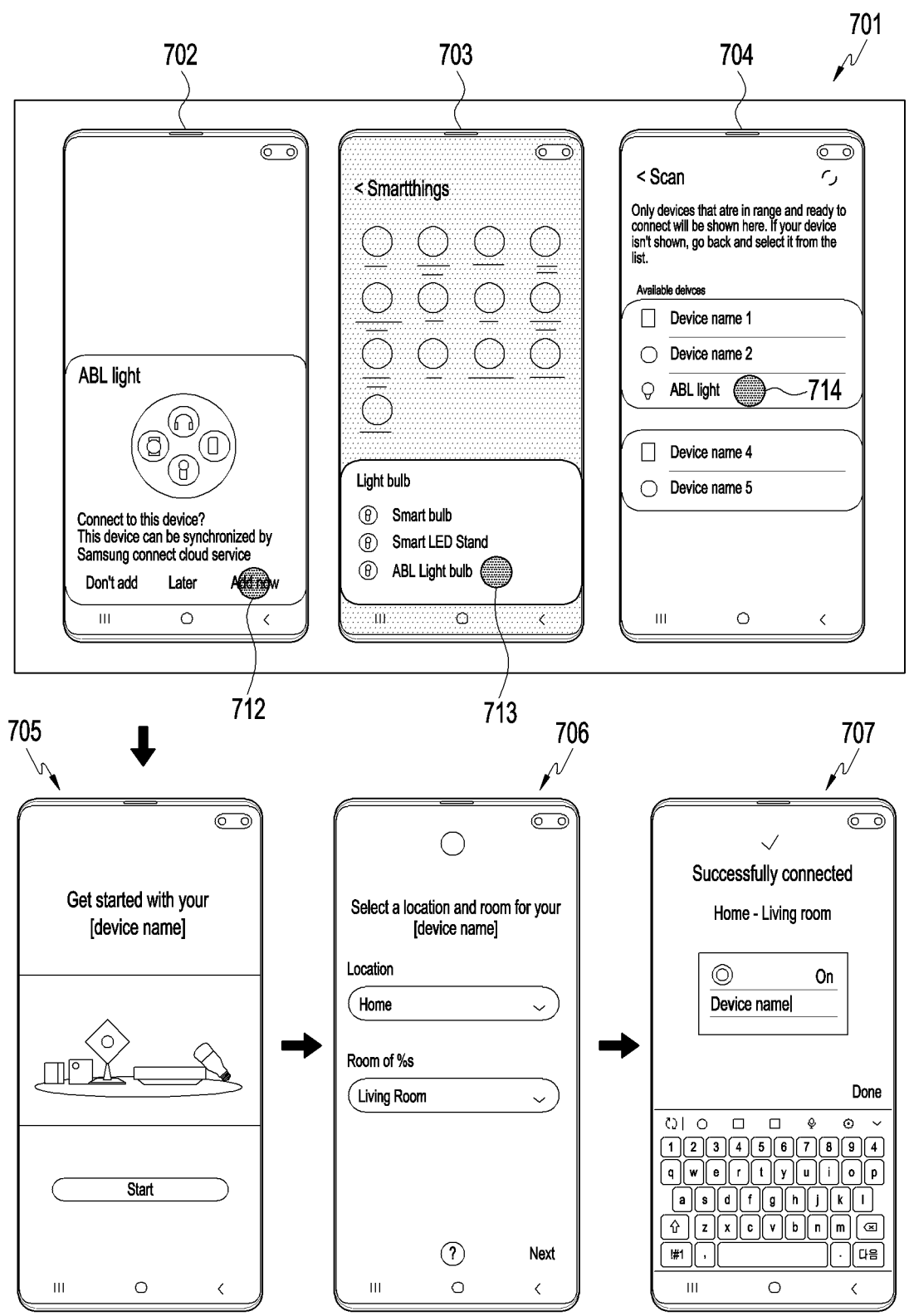
FIG. 7A is a diagram illustrating an example operation of registering information generated based on pairing with a target device in a server in an electronic device according to certain embodiments.
Figure 7B:
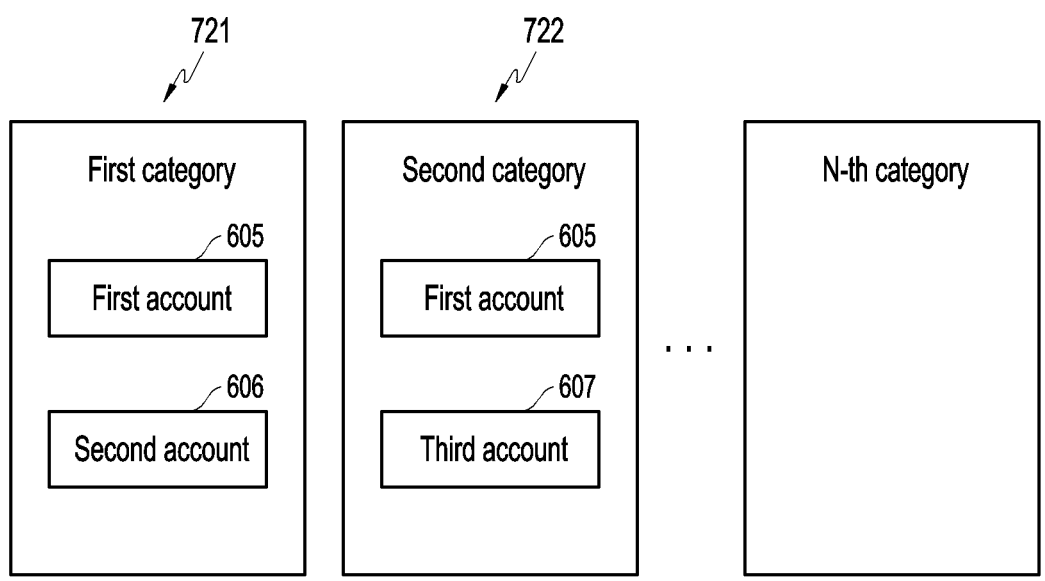
FIG. 7B is a diagram illustrating an example of accounts and categories in which first information and/or second information is registered according to certain embodiments.

FIG. 6 is a diagram illustrating another example operation of the system 200 according to certain embodiments. FIG. 7A is a diagram illustrating an example operation of registering information generated based on pairing with a target device to a server in an electronic device according to certain embodiments. FIG. 7B is a diagram illustrating accounts and categories in which first information and/or second information is registered according to certain embodiments.

According to certain embodiments, the first electronic device 201 (e.g., the at least one processor) may receive a first signal broadcast from the target device 203 in operation 501, perform pairing with the target device 203 in operation 502, receive a device ID from the target device 203 in operation 503, generate first information and/or second information based on the pairing and obtain additional information in operation 504, and control the communication circuit (e.g., the BLE communication circuit) to transmit the generated first information and/or second information to the target device 203 in operation 505. In other words, the first electronic device 201 may perform pairing with the target device 203 in the setup mode, generate first information (e.g., an adv ID) to be included in a signal (e.g., an advertisement signal) to be transmitted periodically from the target device 203 operating in the operation mode and second information (e.g., a symmetric key) for encrypted communication with the target device 203, based on a result of the pairing, and provide the generated first information and/or second information to the target device 203 so that the first information and/or the second information may be stored in the target device 203. Operations 501 to 505 of the first electronic device 201 may be performed in the same manner as the afore-described operations 301 to 305 of the first electronic device 201, and thus a redundant description will be omitted. In this case, as in operation 303 described above, the first electronic device 201 may autonomously generate the device ID identifying the target device 203, instead of operation 503 of receiving the device ID from the target device 203. Alternatively, the device ID identifying the target device 203 may be generated by another external device (e.g., the server 204), which will be described later in operation 507.

According to certain embodiments, the first electronic device 201 (e.g., the at least one processor) may obtain various types of additional information based on the pairing with the target device 203. For example, the various types of additional information may be contextual information such as time information and location information. The time information may indicate a time related to the pairing between the first electronic device 201 and the target device 203. For example, the time information may indicate a time when the first electronic device 201 receives the first signal from the target device 203 or a time when the first electronic device 201 and the target device 203 perform pairing. The location information may indicate a location related to the first electronic device 201 or the target device 203. For example, the location information may indicate a location at which the target device 203 is positioned (e.g., a living room, a master bedroom, or the like, when the target device 203 is provided at home) or a location at which the first electronic device 201 performs pairing with the target device 203 (e.g., a location obtained by using a GNS module/Wifi module, when the first electronic device 201 performs pairing). The additional information may be obtained using various modules (e.g., a GNS module and so on) included in the first electronic device 201 or may be input from the outside (e.g., a user input) and thus obtained. The first electronic device 201 may establish a communication connection with the target device 203 operating in the operation mode based on the obtained additional information, which will be described in detail later with reference to FIGS. 12 and 13.

According to certain embodiments, the first electronic device 201 (e.g., the at least one processor) may transmit the generated first information and second information, the device ID, and various types of additional information to the server 204 in operation 506 (i.e., 602 of FIG. 6). For example, the first electronic device 201 may control the communication circuit (e.g., various communication circuits) to transmit a message requesting registration of the first information, the second information, the device ID, and the various types of additional information to the server 204, as illustrated in FIG. 6. Instead of operation 506 in which the first electronic device 201 transmits the device ID to the server 204, the server 204 may autonomously generate the device ID, which will be described in detail later in operation 507. The first electronic device 201 may request registration of the above-described information in a specific account from the server 204, which will be described in detail later in operation 507.

According to certain embodiments, the first electronic device 201 (e.g., the at least one processor) may perform an operation of registering the target device 203 in the setup mode based on an input received from the user. The registration of the target device 203 may include registering information related to the target device 203 in the server 204, which may mean registration (or storage) of the first information and the second information generated based on the pairing with the target device 203, the device ID received from the target device 203, or the various types of additional information (e.g., the location information) in the server 204.

For example, the first electronic device 201 (e.g., the at least one processor) may identify the at least one target device 203 in the setup mode, and receive an input requesting registration of the identified at least one target device 203 in the setup mode in the server 204 from the user. To this end, the first electronic device 201 may display various types of interfaces for receiving a user input, as illustrated in 701 of FIG. 7A. For example, as illustrated in 702 of FIG. 7A, the first electronic device 201 may display information related to the identified target device 203 in the setup mode on an execution screen of a specific application (e.g., a screen of a Smart Things app) and receive 712 an input for registering the target device 203 on the execution screen of the specific application. In this case, in response to the identification of the at least one target device 203 in the setup mode, the first electronic device 201 may automatically display the above-described execution screen of the specific application. In another example, as illustrated in 703 of FIG. 7A, the first electronic device 201 may display the execution screen of the specific application including information related to the identified target device 203 in the setup mode and receive 713 an input requesting registration of the target device 203, in response to a command to execute the specific application from the user (e.g., selection of an icon for executing the specific application on a home screen). In another example, as illustrated in 704 of FIG. 7A, the first electronic device 201 may display a communication setting screen (e.g., a BLE communication setting) including the information related to the identified setup mode target device 203, and receive 714 a user input for registering the target device 203 on the communication setting screen (e.g., the BLE communication setting screen).

The first electronic device 201 (e.g., the at least one processor) may display an interface (e.g., the execution screen of the specific application described above) for performing a procedure of registering the generated first information and second information, the device ID, and the various types of additional information in the server 204, based on reception of an input requesting registration of the target device 203 in the server 204 from the user, as illustrated in 704 of FIG. 7A. The first electronic device 201 may receive various types of information related to the target device 203 from the user on the interface. For example, as illustrated in 705 of FIG. 7A, the first electronic device 201 may receive location information about the target device 203 from the user. Then, when the procedure is completed, the first electronic device 201 may automatically transmit, to the server 204, a request message for registering the generated first information and second information, the device ID, and the various types of additional information to the server 204, as illustrated in 706 of FIG. 7A. Accordingly, as illustrated in 707 of FIG. 7A, the first information, the second information, the device ID, and the various types of additional information may be registered.

According to certain embodiments, the server 204 (e.g., at least one processor) may store the first information, the second information, the device ID, and the various types of additional information received from the first electronic device 201 in operation 507.

According to certain embodiments, the server 204 (e.g., the at least one processor) may store the first information, the second information, the device ID, and the various types of additional information on an account basis. For example, the server 204 may store information about a plurality of accounts 605 and 606, and receive or manage information received from the first electronic device 201 on an account basis, as illustrated in FIG. 7A. In this case, the server 204 may generate the device ID identifying the target device 203 instead of receiving the device ID from the first electronic device 201 in operation 506 as described above. For example, the server 204 may generate specific identification information and use the generated identification information as the device ID. The operation of autonomously generating the device ID by the server 204 may be performed in the same manner as the above-described operation of autonomously generating the device ID by the first electronic device 201, and thus a redundant description will be omitted.

According to certain embodiments, each of the accounts 605 and 606 may include at least one electronic device. That is, the server may store and manage information about a list of electronic devices included in the accounts 605 and 606. Accordingly, the server 204 may identify at least one electronic device included in a specific account, and grant a right to access information (e.g., first information and/or second information) assigned to the specific account to the at least one device (e.g., the at least one device may register information in the specific account or receive information registered in the specific account). Specifically, the server 204 may request information (e.g., an account ID or an account password) for using the specific account from electronic devices accessing the server 204, and when the requested information is received, grant a right to access to the specific account to a corresponding electronic device.

According to certain embodiments, the first electronic device 201 (e.g., the at least one processor) may request the server 204 to generate a specific account. For example, as illustrated in FIG. 7A, the first electronic device 201 may transmit 601 a message requesting generation of a first account 605 including the first electronic device 201 to the server 204. In this case, the first electronic device 201 may set information (e.g., an account ID or an account password) for using the generated first account 605.

Further, the first electronic device 201 (e.g., the at least one processor) may request registration of information (the first information, the second information, the device ID, and the additional information) in the generated specific account. For example, the first electronic device 201 may transmit a message requesting registration of the first information, the second information, the device ID, and the additional information in the first account 605 to the server 204, as illustrated in FIG. FIG. 7A. Upon receipt of the request, the server 204 may allocate the first information, the second information, the device ID, and the additional information to the first account 605.

Further, the first electronic device 201 (e.g., the at least one processor) may transmit a message requesting inclusion or exclusion of another electronic device in the specific account, so that a right to access the information registered in the specific account is granted to or revoked from the other electronic device. For example, as illustrated in FIG. 7A, the first electronic device 201 may request 603 the server 204 to include the second electronic device 202 in the first account 605. Further, for example, the first electronic device 201 may request the server 204 to remove the second electronic device 202 from the first account 605.

According to certain embodiments, the first electronic device 201 may perform at least some of the above-described specific account generation, request for registration of information in a specific account, and registration of another device in the specific account of the first electronic device 201. In other words, some of the above-described operations may be performed by the first electronic device 201 which has identified the target device 203 in the setup mode and registered the target device 203 to the server 204. For example, the operation of specific account generation and the operation of registering another device in the specific account may be performed by the first electronic device 201, and the other operation of requesting registration of information in the specific account may be performed by another electronic device (e.g., the second electronic device 202) other than the first electronic device 201, included in the first account 605. Without being limited to the above description, according to certain embodiments, at least some of the above-described operations may be performed in the first electronic device 201.

According to certain embodiments, the accounts may be classified into specific categories (e.g., a first category 721 and a second category 722), as illustrated in FIG. 7B. In this case, information allocated to accounts included in one category may be shared with each other. Accordingly, the first information and/or the second information included in the specific account may be shared with other accounts.

For example, the first electronic device 201 may request generation of an account (e.g., the first account 605), and request the server 204 to set a category (e.g., the first category 721) for the generated account. The category for the account may be set according to a user input, when the first electronic device 201 generates the account, or automatically by devices (e.g., the first electronic device 201 or the server 204) without a user input. For example, the first electronic device 201 may generate the first account and set a category (e.g., the first category 721) for the first account according to a user input. In a specific example, the user of the first electronic device 201 may control the electronic device 201 to generate a category "family" together with an account for registering the first information and/or the second information related to the target device 203, so that the other members of the family may also use the account. In another specific example, the user of the first electronic device Further, for example, the first electronic device 201 may request the server 204 to register another account (e.g., the second account 606) in the generated category (e.g., the first category 721). As illustrated in FIG. 7B, the second account 606 as well as the first account 605 causing generation of the first category 721 may be registered in the first category 721, and a third account 607 as well as the first account 605 causing generation of the second category 722 may be registered in the second category 722. Accordingly, an electronic device corresponding to the second account 606 included in the same category may access and use the first information and/or the second information registered in the first account 605 (e.g., control the target device 203 by using the first information and/or the second information registered in the first account 605).

According to certain embodiments, information may be registered and shared in a specific category, as well as the registered first information and/or second information is shared between accounts included in the specific category as described above. For example, the first electronic device 201 may request the server 204 to register the first information and/or the second information in the first category 721, and accordingly, accounts (e.g., the first account 605 and the second account 607) included in the first category 721 may access the first information and/or the second information included in the first category 721. Further, for example, the first electronic device 201 may request the server 204 to register information different from the information registered in the first category 721 in the second category 722, and the information registered in the second category 722 may be shared with an account (e.g., the third account 607) different from the accounts registered in the first category 721.

According to certain embodiments, the first electronic device 201 may directly authorize a specific device to access the first information and/or the second information. For example, the first electronic device 201 may transmit, to the server 204, a message requesting granting of the access right to the first information and/or the second information registered in the specific account (e.g., the first account 605) or in the specific category (e.g., the first category 721) to another account corresponding to another electronic device. Further, for example, the first electronic device 201 may transmit, to the server, identification information about another electronic device and a message requesting granting of the access right to the first information and/or the second information registered in the specific account (e.g., the first account 605) or the specific category (e.g., the first category 721) to the other electronic device. Accordingly, when the other electronic device is connected to the server 204, the server 204 may identify the other electronic device based on identification information about the other electronic device and grant the access right to the first information and/or the second information registered in the specific account (e.g., the first account 605) or the specific category (e.g., the first category 721) to the other electronic device.

According to certain embodiments, the first electronic device 201 (e.g., the at least one processor) may terminate the communication connection with the target device 203 in operation 508. Since operation 508 of the first electronic device 201 may be performed in the same manner as operation 307 of the first electronic device 201 described above, a redundant description will be omitted.

According to certain embodiments, the server 204 (e.g., the at least one processor) may transmit the first information, the second information, the device ID, and the additional information to the second electronic device 202 in operation 509. For example, when identifying that the second electronic device 202 that accesses the server 204 and requests 604 information is included in the first account 605 (or obtains ID and password information to access the first account 605), the server 204 may transmit the first information, the second information, the device ID, and the additional information registered in the first account 605 to the second electronic device 202, as illustrated in FIG. 7B.

According to certain embodiments, when the second electronic device 202 (e.g., the at least one processor) is located within a specified distance from the target device 203, the second electronic device 202 may receive a second signal including first information broadcast from the target device 203 in operation 510, perform a scanning operation based on the first information in operation 511, and perform encrypted communication with the target device 203 based on the scanning in operation 512. For example, the second electronic device 202 may receive a second signal including the first information broadcast from the target device 203 operating in the operation mode, identify the target device 203 based on the scanning performed based on the first information stored in the second electronic device 202, and perform encrypted communication with the target device 203 based on the second information. Operations 510 to 512 of the second electronic device 202 may be performed in the same manner as operations 308 to 311 of the second electronic device 202 described above, and thus a redundant description will be omitted.

The operational load of sharing the first information and/or the second information generated as described above may be reduced by sharing the first information and/or the second information using the server 204 rather than in a D2D manner. Further, as the server 204 manages the first information and/or the second information on an account basis and grants an access right to an account, the security of the first information and/or the second information may be improved.

An example operation of an electronic device (e.g., the first electronic device 201 or the second electronic device 202) according to certain embodiments will be described below. A redundant description of the above-described electronic device (e.g., the first electronic device 201 or the second electronic device 202) will be omitted.

According to certain embodiments, the electronic device (e.g., the first electronic device 201 or the second electronic device 202) may randomly generate first information (e.g., an adv ID) and second information (e.g., a symmetric key) based on pairing with the target device 203. Herein, random may mean that the first information and/or the second information are generated as a variable value, not as a fixed value. A description will be given below of an example of randomly generating first information and/or second information in an electronic device.

Figure 8:
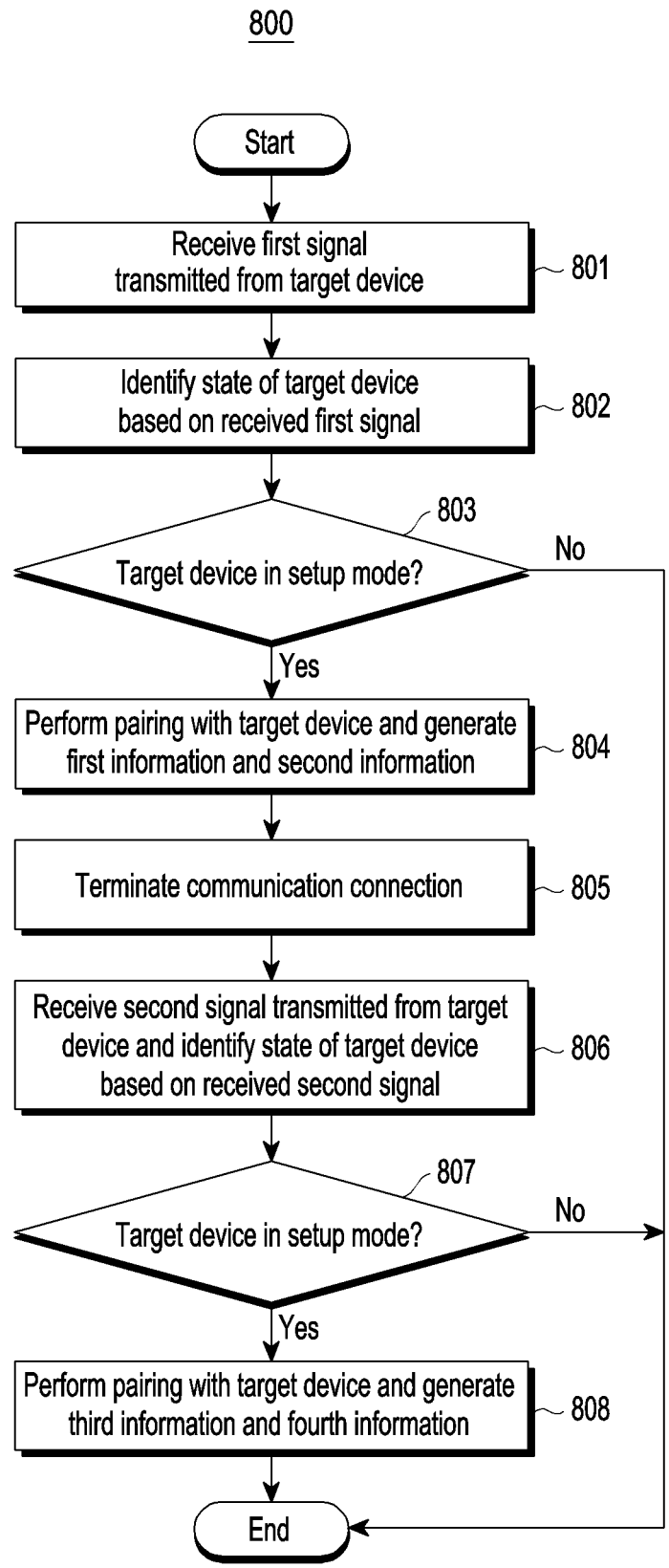
FIG. 8 is a flowchart illustrating an example operation of randomly generating first information and/or second information in an electronic device according to certain embodiments.

FIG. 8 is a flowchart 800 illustrating an example operation of randomly generating first information and/or second information in an electronic device according to certain embodiments. According to certain embodiments, the operations of the electronic device may be performed in an order different from the operation order of the electronic device illustrated in FIG. 8, not limited to the illustrated order. Further, according to certain embodiments, more operations than or at least one operation fewer than those of the electronic device illustrated in FIG. 8 may be performed. FIG. 8 will be described below with reference to FIG. 9.

Figure 9:
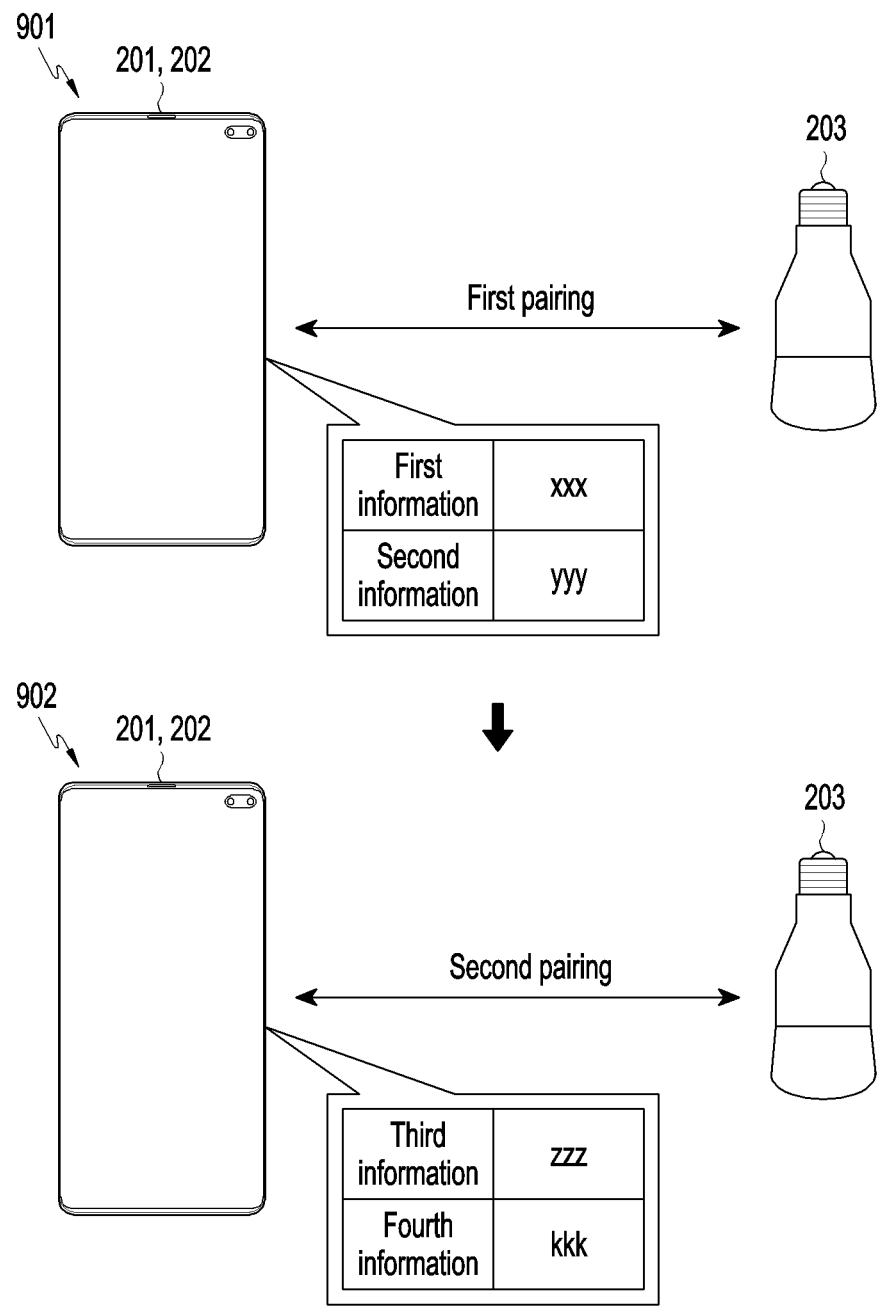
FIG. 9 is a diagram illustrating an example operation of randomly generating first information and/or second information in an electronic device according to certain embodiments.

FIG. 9 is a diagram illustrating an example operation of randomly generating first information and/or second information in an electronic device.

According to certain embodiments, the electronic device (e.g., the first electronic device 201 or the second electronic device 202) may receive a first signal transmitted from the target device 203 in operation 801, and identify a state of the target device 203 based on the received first signal in operation 802. For example, when the electronic device is located within a specified distance from the target device 203, the electronic device may receive the first signal (e.g., an advertisement signal) transmitted from the target device 203, and identify whether first information (e.g. an adv ID) is included in the first signal. When the first signal does not include the first information, the electronic device (e.g., the first electronic device 201 or the second electronic device 202) may identify that the target device 203 is operating in a setup mode, and when the first signal includes the first information, it may be determined that the target device 203 is operating in the operation mode.

According to certain embodiments, the electronic device (e.g., the first electronic device 201 or the second electronic device 202) ma perform pairing with the target device 203 and generate the first information and/or second information in operation 804 based on the identification that the target device 203 is operating in the setup mode in operation 803. For example, the electronic device (e.g., the first electronic device 201 or the second electronic device 202) may generate first information (e.g., an adv ID) of "xxx" and second information (e.g., a symmetric key) of "yyy", based on performing first pairing with the target device 203, as illustrated with device 901 of FIG. 9.

According to certain embodiments, the electronic device (e.g., the first electronic device 201 or the second electronic device 202) may terminate a communication connection with the target device 203 in operation 805. Since operation 805 of the electronic device may be performed in the same manner as operation 307 of the electronic device (e.g., the first electronic device 201 or the second electronic device 202) described before, a redundant description will be omitted.

According to certain embodiments, the electronic device (e.g., the first electronic device 201 or the second electronic device 202) may receive a second signal transmitted from the target device 203, and identify the state of the target device 203 based on the received second signal in operation 806. For example, the electronic device (e.g., the first electronic device 201 or the second electronic device 202) may be re-disposed within the specified distance from the target device 203 after the communication is terminated (e.g., after leaving the specified distance), and accordingly, receive the second signal transmitted from the target device 203. Since operation 806 of the electronic device may be performed in the same manner as operations 801 and 802 of the electronic device described before, a redundant description will be omitted.

According to certain embodiments, in operation 808, the electronic device (e.g., the first electronic device 201 or the second electronic device 202) may generate third information and fourth information based on identification that the target device 203 is operating in the setup mode in operation 807. For example, the electronic device (e.g., the first electronic device 201 or the second electronic device 202) may identify information included in the second signal received from the target device 203 after the communication with the target device 203 is terminated. The electronic device (e.g., the first electronic device 201 or the second electronic device 202) may identify the device ID of the target device 203 stored in the electronic device (e.g., the first electronic device 201 or the second electronic device 202) based on the second signal received from the target device 203, and identify the first information corresponding to the identified device ID. When identifying that the identified first information is not included in the second information received from the target device 203, the electronic device (e.g., the first electronic device 201 or the second electronic device 202) may identify that the target device 203 has been reset to the setup mode. The electronic device (e.g., the first electronic device 201 or the second electronic device 202) may perform second pairing with the target device 203 reset to the setup mode, and generate third information (e.g., an adv ID) of "zzz", different from the pre-generated first information and fourth information of "kkk" different from the pre-generated second information based on the performed second pairing, as illustrated with device 902 of FIG. 9.

According to certain embodiments, the electronic device (e.g., the first electronic device 201 or the second electronic device 202) may update the newly generated third information and fourth information. For example, the electronic device (e.g., the first electronic device 201 or the second electronic device 202) may delete the first information and/or the second information pre-stored in association with the device ID of the target device 203, and store newly generated first information and/or second information in association with the device ID of the target apparatus 203. Further, for example, the electronic device (e.g., the first electronic device 201 or the second electronic device 202) may transmit the newly generated third information and fourth information to the server, so that the server may delete the first information and/or the second information, and store the newly generated third information and fourth information.

When the electronic device (e.g., the first electronic device 201 or the second electronic device 202) has performed pairing multiple times (e.g., twice) with the same target device 203, then, the operation of randomly generating first information and/or the second information by the electronic device (e.g., the second electronic device 203) may also be performed even when the electronic device (e.g., the first electronic device 201 or the second electronic device 202) performs different pairings (i.e., multiple pairings) for each of different devices.

As described above, as the first information and/or the second information is randomly generated, the security of the first information and/or the second information may be improved.

Hereinafter, an example operation of an electronic device (e.g., the electronic device, such as the first electronic device 201 or the second electronic device 202) will be described. A redundant description related to the electronic device (e.g., the first electronic device 201 or the second electronic device 202) will be omitted.

According to certain embodiments, the electronic device (e.g., the first electronic device 201 or the second electronic device 202) may display information related to the target device 203.

FIG. 10 is a flowchart 1000 illustrating an example operation of displaying information related to the target device 203 in an electronic device according to certain embodiments. According to certain embodiments, the operations of electronic device may be performed in an order different from the operation order of the electronic device illustrated in FIG. 10, not limited to the illustrated order. Further, according to certain embodiments, more operations than or at least one operation fewer than those of the electronic device illustrated in FIG. 10 may be performed. FIG. 10 will be described below with reference to FIG. 11.

Figure 11:
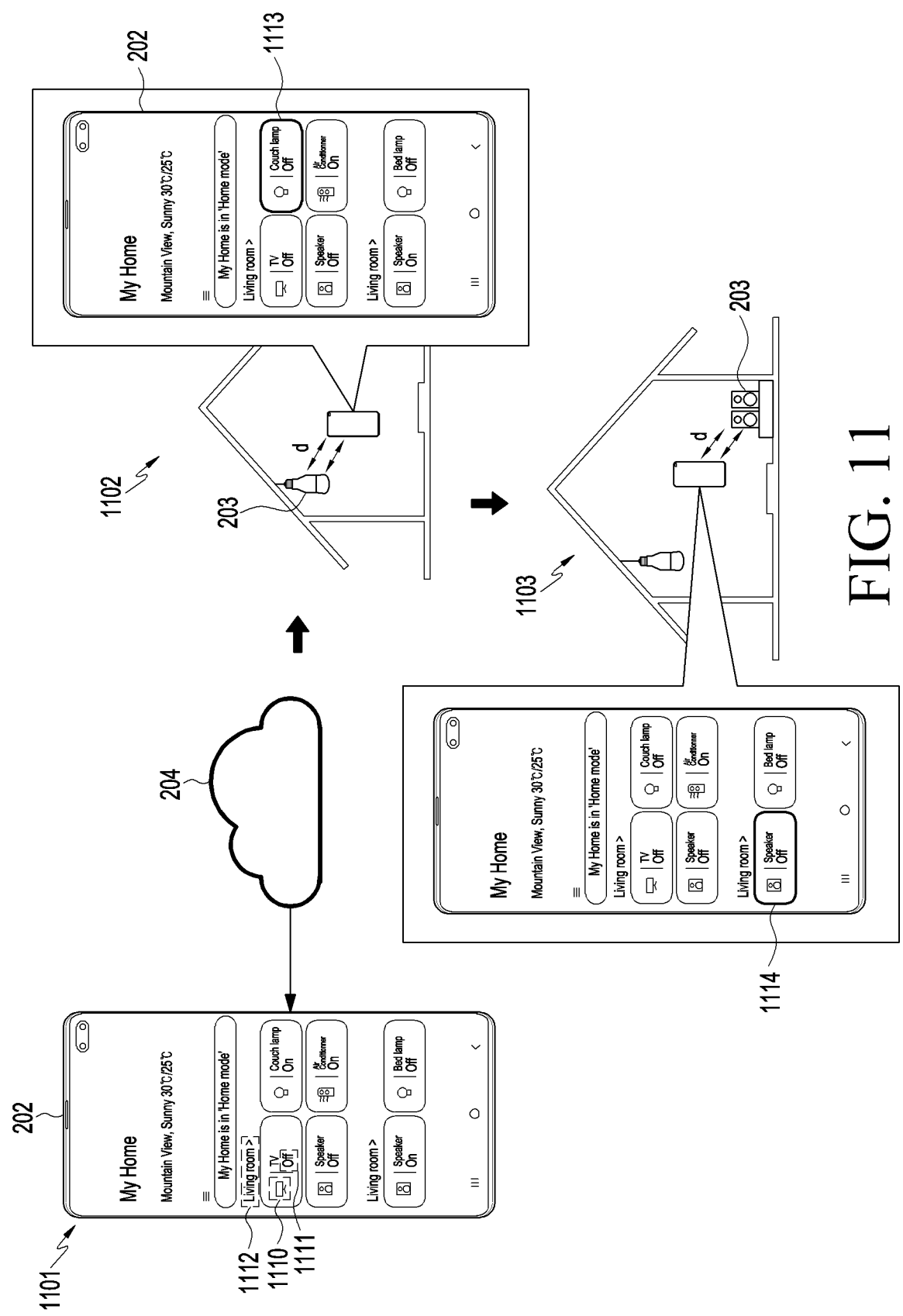
FIG. 11 is a diagram illustrating an example operation of displaying information related to a target device in an electronic device according to certain embodiments.

FIG. 11 is a diagram illustrating an example operation of displaying information related to the target device 203 in an electronic device according to certain embodiments.

According to certain embodiments, the electronic device may obtain information related to the target device 203 in operation 1001, and display an interface for indicating the state of the target device 203 based on the information related to the target device 203 in operation 1002.

According to certain embodiments, the electronic device (e.g., the second electronic device 202) may receive information related to the target device 203 registered in the server 204, as illustrated in FIG. 11. For example, the information related to the target device 203 may include at least one of the device ID of the target device 203 included in a specific account including the electronic device, stored in the server 204, or additional information (e.g., time information and location information) stored in association with the device ID, or information for displaying a graphic element (e.g., information for displaying a graphic element corresponding to the target device 203). Without being limited to the above description, the information for displaying a graphic element may be generated by the electronic device based on the information related to the target device 203 received from the server 204.

Alternatively, the electronic device (e.g., the first electronic device 201) may obtain information (e.g., the additional information including the device ID and the location information) as a result of performing pairing with the target device 203.

According to certain embodiments, the electronic device (e.g., the first electronic device 201 or the second electronic device 202) may display an execution screen of a specific application including graphic elements (e.g., 1110, 1111, and 1112), based on the obtained information related to the target device 203, as illustrated in 1101 of FIG. 11. For example, the electronic device may obtain an execution command for a specific application for provision to the target device 203, execute the specific application based on the obtained execution command, and display the execution screen of the specific application, as illustrated in 1101 of FIG. 11. The electronic device may display a first graphic element (e.g., icon) 1110 to represent the target device 203 that was identified based on the device ID of the target device 203, on the execution screen of the specific application of the target device 203. Further, the electronic device may display a second graphic element 1111 capable of providing information related to the target device 203 (e.g., a state value of the target device 203, such as a control function thereof) in association with the above-described first graphic element 1110. (e.g., displayed in a blank space within the first graphic element). In addition, the electronic device may display a third graphic element 1112 (e.g., an object indicating the location of the target device 203) indicating information identified based on the additional information related to the device ID in association with the graphic element 1110, or may display graphic elements representing target devices 203 having similar additional information in a group.

According to certain embodiments, when the electronic device is located within a specified distance from the target device 203, the electronic device may establish a communication connection with the target device 203 by receiving a signal including first information from the target device 203 in operation 1003, and transceiving encrypted data through the communication connection based on second information in operation 1004. For example, as illustrated in 1102 and 1103 of FIG. 11, when the electronic device is located within a specified distance "d" from the target device 203, the electronic device may receive an encrypted value of a specific service of the target device 203 from the target device 203, and transmit a message for changing the state value of the specific service of the target device 203 to the target device 203.

According to certain embodiments, the electronic device may display transmitted and received data in the interface in operation 1005. For example, as illustrated in 1102 and 1103 of FIG. 11, when the electronic device receives the encrypted state value of the specific service of the target device 203 from the target device 203, the electronic device may highlight the icon of the target device 203 to indicate the existence of the target device 203, and update and display elements 1113 and 1114 to indicate the present state value of the target device 203 (e.g., indicating whether the target device 203, such as a lamp or speaker, is on/off).

Another example operation of the electronic device (e.g., the first electronic device 201 or the second electronic device 202) will be described below. A redundant description related to the above-described electronic device (e.g., the first electronic device 201 or the second electronic device 202) will be omitted.

According to certain embodiments, the electronic device (e.g., the first electronic device 201 or the second electronic device 202) may establish a communication connection with the target device 203 in the operation mode based on obtained additional information.

Figure 12:
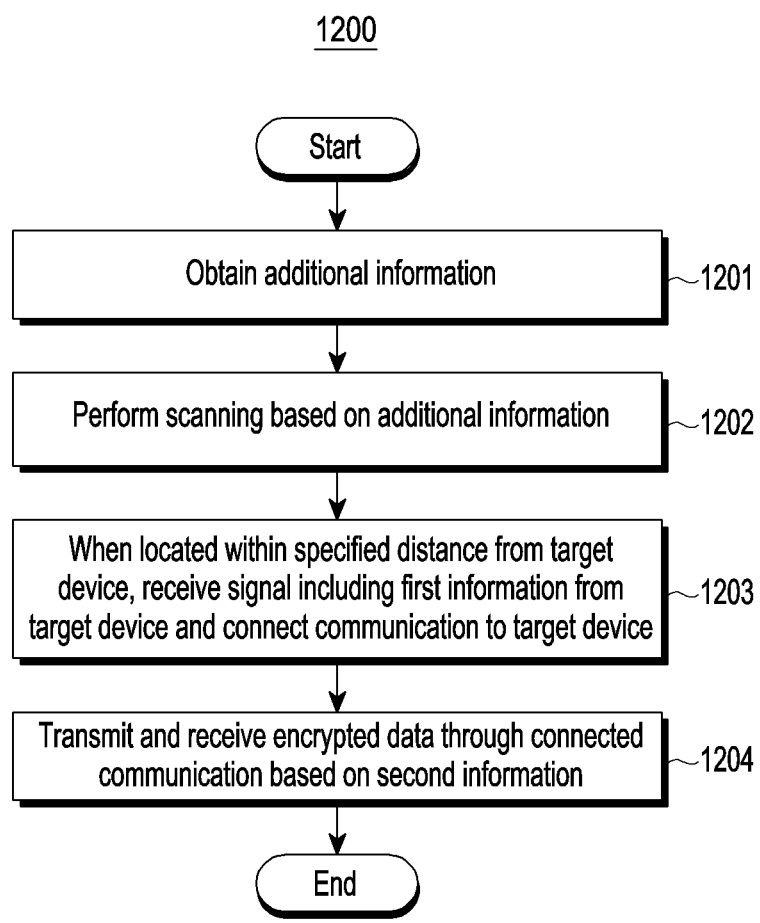
FIG. 12 is a flowchart illustrating an example operation of establishing a communication connection with a target device based on additional information in an electronic device according to certain embodiments.

FIG. 12 is a flowchart 1200 illustrating an example operation of establishing a communication connection with a target device based on additional information in an electronic device according to certain embodiments. According to certain embodiments, the operations of the electronic device may be performed in an order different from the operation order of the electronic device illustrated in FIG. 12, not limited to the illustrated order. Further, according to certain embodiments, more operations than or at least one operation fewer than those of the electronic device illustrated in FIG. 12 may be performed. FIG. 12 will be described below with reference to FIG. 13.

Figure 13:
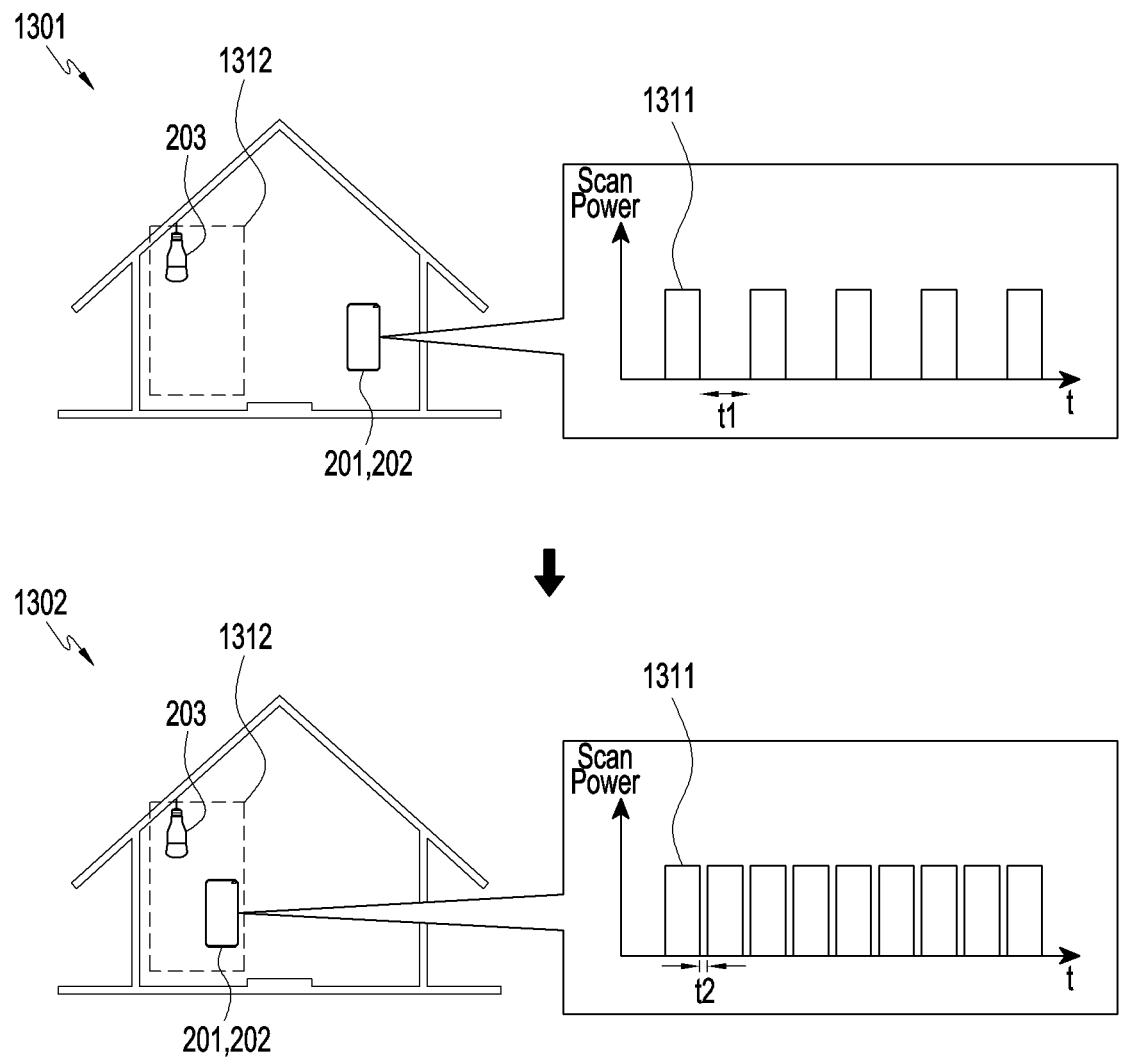
FIG. 13 is a diagram illustrating an example operation of establishing a communication connection with a target device based on additional information in an electronic device according to certain embodiments.

FIG. 13 is a diagram illustrating an example operation of establishing a communication connection with the target device 203 based on additional information in an electronic device according to certain embodiments.

According to certain embodiments, the electronic device (e.g., the first electronic device 201 or the second electronic device 202) may obtain additional information in operation 1201. For example, the first electronic device 201 may obtain the additional information upon pairing with the target device 203. Further, for example, the second electronic device 202 may obtain the additional information related to the target device 203 from the server. Because the operation of obtaining additional information in the first electronic device 201 is performed in the same manner as operation 504 of the first electronic device 201, and the operation of obtaining additional information in the second electronic device 202 is performed in the same manner as operation 509 of the second electronic device 202, a redundant description will be omitted.

According to certain embodiments, the electronic device (e.g., the first electronic device 201 or the second electronic device 202) may perform scanning based on the obtained additional information in operation 1202.

For example, as illustrated in 1301 and 1302 of FIG. 13, the electronic device (e.g., the first electronic device 201 or the second electronic device 202) may control the frequency of a scan signal 1311 based on location information. The electronic device may identify the location of the target device 203 based on the obtained location information, and increase the frequency of the scan signal at the identified location. As illustrated in 1301 of FIG. 13, when the location of the target device 203 does not correspond to the location of the electronic device, as determined by comparing the location of the target device 203 with the location of the electronic device based via the location information, the electronic device may set a scan frequency such that the scan signal 1311 is transmitted at an interval of a first time t1. In contrast, when the location of the target device 203 corresponds to the location of the electronic device as illustrated in 1302 of FIG. 13, the electronic device may set the scan frequency so that the scan signal 1311 may be transmitted at an interval of a second time t2, which may be shorter than the first time t1. For example, as illustrated in FIG. 13, the electronic device may identify location information related to the target device 203, and identify that the target device 203 is disposed in a known location (e.g., a kitchen) 1312 based on the identified location information. The electronic device may identify whether the electronic device is also disposed at the identified location 1312, and if so, increase the scan frequency.

Further, for example, the electronic device (e.g., the first electronic device 201 or the second electronic device 202) may control the frequency of the scan signal based on time information. The electronic device may identify a time zone in which the pairing or the communication connection establishment with the target device 203 is performed, based on the time information so as to identify a time zone in which the target device 203 is frequently used. The electronic device may set the scan frequency of the scan signal to a higher frequency in the identified time zone than in other time zones.

According to certain embodiments, when the electronic device (e.g., the first electronic device 201 or the second electronic device 202) is located within a specified distance from the target device 203, the target device 203 may receive a signal including first information from the target device 203 and establish a communication connection to the target device 203 in operation 1203, and transmit/receive encrypted data through the communication connection based on second information in operation 1204. Operations 1203 and 1204 of the electronic device may be performed in the same manner as operations 308 to 311 of the second electronic device 202 described above, and thus a redundant description will be omitted.

As the scan frequency of the electronic device is adjusted based on additional information as descried above, a time taken to detect the target device 203 is reduced in a situation in which the detection possibility of the target device 203 is high, and power consumption for detection of the target device 203 may be reduced in a situation in which the detection possibility is low.

An example operation of the target device 203 will be described below. A redundant description related to the above-described target device 203 will be omitted below.

According to certain embodiments, the target device 203 may transmit a first signal for pairing with an electronic device (e.g., the first electronic device or the second electronic device) in the setup mode, whereas the target device 203 may transmit a second signal including first information (e.g., an adv ID) generated by the paired electronic device operating in the operation mode.

Figure 14:
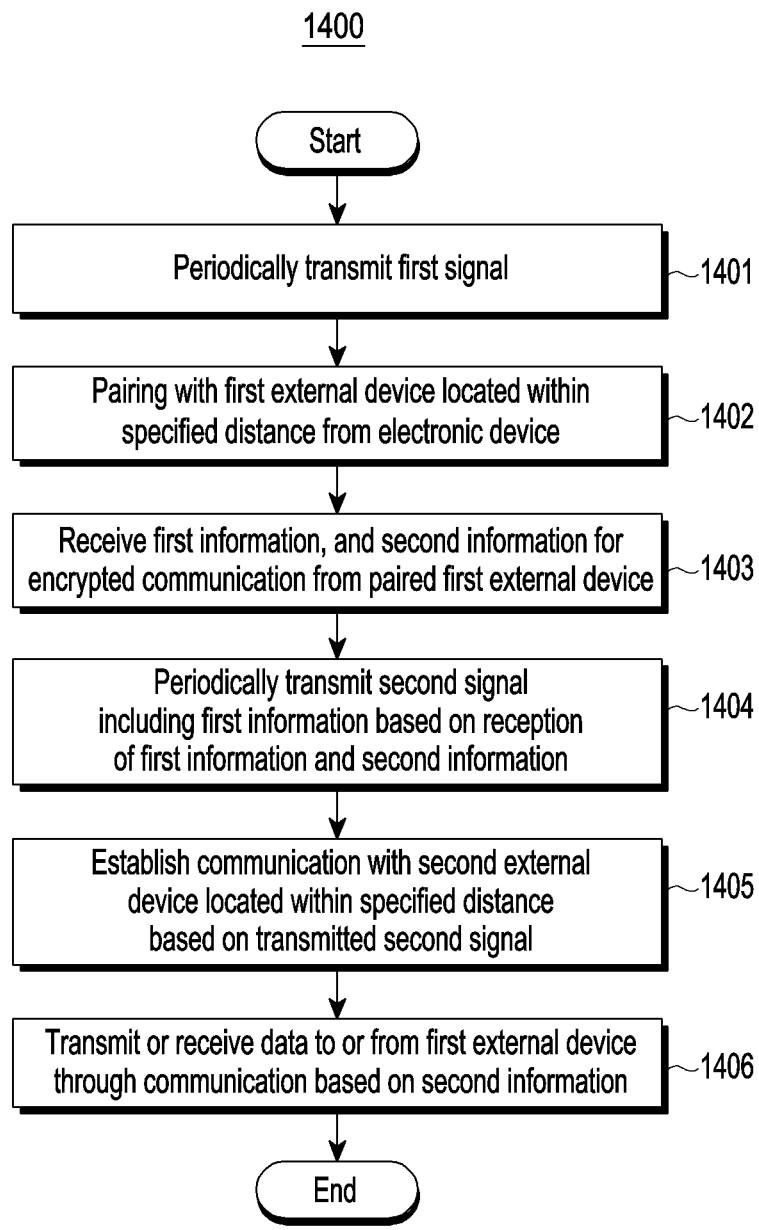
FIG. 14 is a flowchart illustrating an example operation of a target device according to certain embodiments.

FIG. 14 is a flowchart 1400 illustrating an example operation of the target device 203 according to certain embodiments. According to certain embodiments, the operations of the target device 203 may be performed in an order different from the operation order of the target device 203 illustrated in FIG. 14, not limited to the illustrated order. Further, according to certain embodiments, more operations than or at least one operation fewer than those of the electronic device illustrated in FIG. 14 may be performed. FIG. 14 will be described below with reference to FIGS. 15 and 16.

Figure 15:
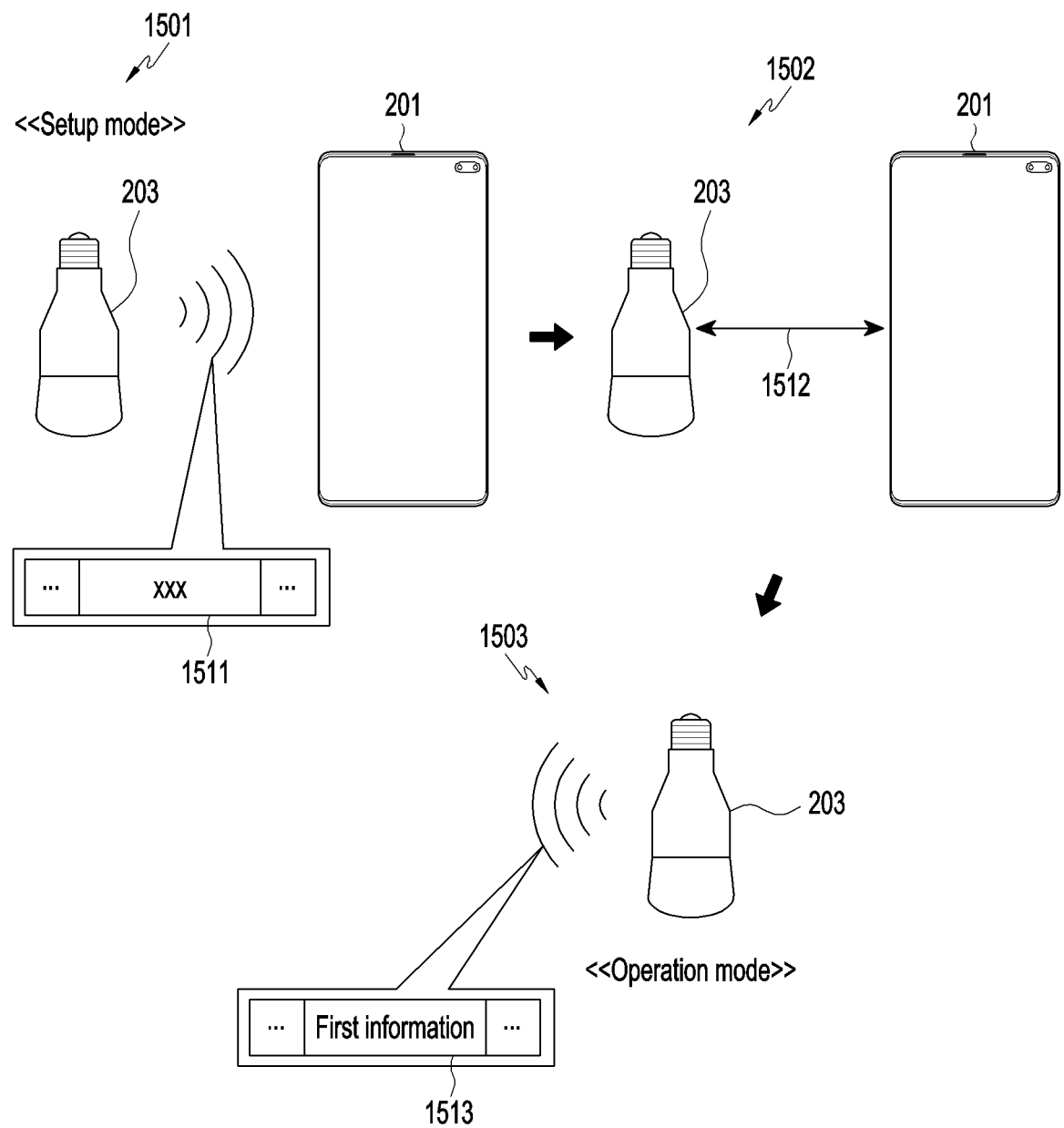
FIG. 15 is a diagram illustrating an example operation of a target device according to certain embodiments.
Figure 16:
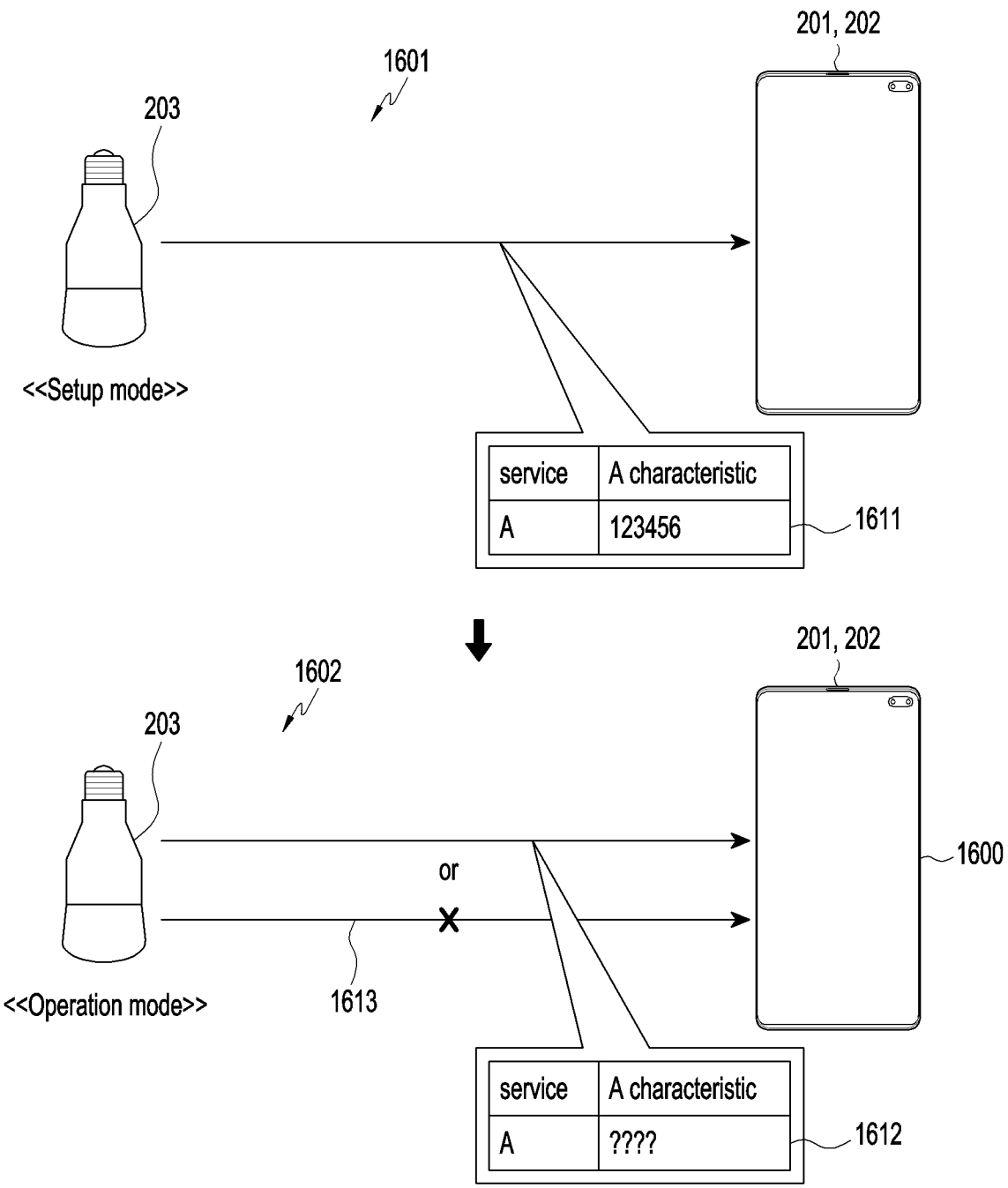
FIG. 16 is a diagram illustrating another example operation of a target device according to certain embodiments.

FIG. 15 is a diagram illustrating an example operation of the target device 203 according to certain embodiments. FIG. 16 is a diagram illustrating another example operation of the target device 203 according to certain embodiments.

According to certain embodiments, in operation 1401, the target device 203 may control the communication circuit (e.g., the BLE communication circuit) to periodically transmit a first signal. For example, when the target device 203 is operating in the setup mode, the target device 203 may periodically broadcast a first signal (e.g., an advertisement signal) 1511 that does not include first information (e.g., an adv ID), so that an electronic device (e.g., the first electronic device 201) within a specified distance from the target device 203 may identify that the target device 203 is operating in the setup mode, as illustrated in 1501 of FIG. 15.

According to certain embodiments, in operation 1402, the target device 203 may control the communication circuit (e.g., the BLE communication circuit) to perform pairing with a first external device located within the specified distance from the electronic device. For example, the target device 203 may receive a response message from the electronic device (e.g., the first electronic device 201) located within the specified distance from the target device 203 in response to the broadcasting of the first signal. In response to the reception of the response message, the target device 203 may perform pairing 1512 with the electronic device (e.g., the first electronic device 201) that has transmitted the response message, as illustrated in 1502 of FIG. 12.

According to certain embodiments, the target device 203 may transmit/receive data to/from the electronic device based on the pairing. For example, after the pairing, the target device 203 may establish a communication connection with the electronic device and transmit 1611 a signal including specific data to the electronic device (e.g., the first electronic device 201). (e.g., a characteristic value of a specific service of the target device 203), as illustrated in 1601 of FIG. 16. The transmitted signal may or may not be encrypted with second information generated as a result of pairing or a temporary key other than the second information, before the second information is stored.

According to certain embodiments, the target device 203 may control the communication circuit (e.g., the BLE communication circuit) to receive first information and second information for encrypted communication from the paired first electronic device in operation 1403.

According to certain embodiments, in operation 1404, the target device 203 may control the communication circuit (e.g., the BLE communication circuit) to periodically transmit a second signal including the first information based on the reception of the first information and/or the second information. For example, the target device 203 may be set to the operation mode after the communication connection with the first electronic device is terminated. The target device 203 set to the operation mode may periodically transmit a second signal 1513 including the first information to notify another electronic device that the target device 203 is operating in the operation mode, as illustrated in 1503 of FIG. 15. Since operation 1404 of the target device 203 may be performed in the same manner as the operation of the target device 203 described in operation 308 of the second electronic device, a redundant description will be omitted.

According to certain embodiments, the target device 203 may establish a communication connection with a second external device located within the specified distance based on the transmitted second signal in operation 1405, and may control the communication circuit (e.g., the BLE communication circuit) to transmit or receive data to or from the first external device through the communication connection based on the second information in operation 1406.

According to certain embodiments, the target device 203 may prevent an unauthorized electronic device from identifying or controlling the state value of the target device 203. The unauthorized electronic device may be defined as an electronic device that fails to obtain first information (e.g., an adv ID) and second information (a symmetric key).

For example, as illustrated in 1602 of FIG. 16, when the target device operating in the operation mode establishes a communication connection with an unauthorized device 1600, the target device 203 may transmit encrypted data (e.g., an encrypted characteristic value of service A) 1612 to the unauthorized device. Alternatively, as illustrated in 1602 of FIG. 16, when receiving a connection request from the unauthorized device 1600 operating in the operation mode, the target device 203 may ignore 1613 the received connection request.

Another example operation of the target device 203 will be described below. A redundant description related to the above-described target device 203 will be omitted.

According to certain embodiments, when a specified condition is satisfied, the target device 203 may transition from the operation mode to the setup mode.

Figure 17:
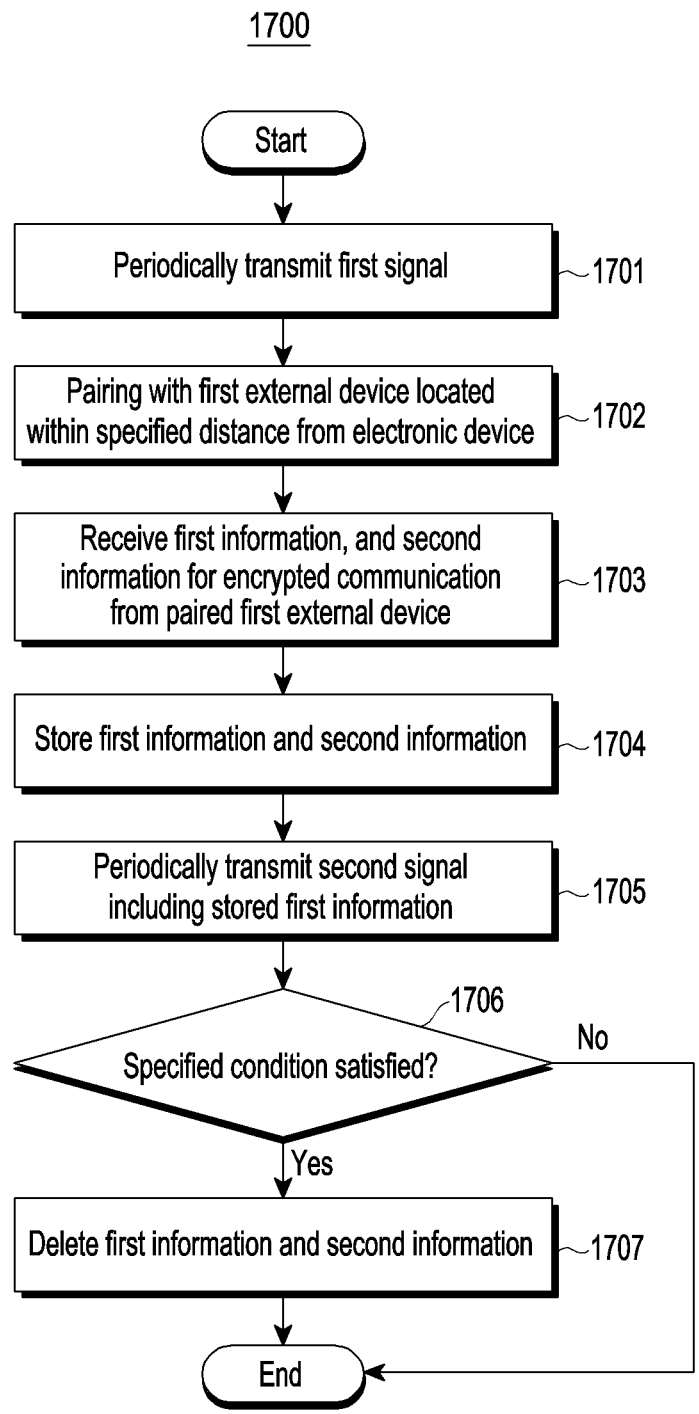
FIG. 17 is a flowchart illustrating an example reset operation of a target device according to certain embodiments.

FIG. 17 is a flowchart 1700 illustrating an example reset operation of the target device 203 according to certain embodiments. According to certain embodiments, the operations of electronic device may be performed in an order different from the operation order of the target device 203 illustrated in FIG. 17, not limited to the illustrated order. Further, according to certain embodiments, more operations than or at least one operation fewer than those of the target device 203 illustrated in FIG. 17 may be performed. FIG. 17 will be described below with reference to FIG. 18.

Figure 18:
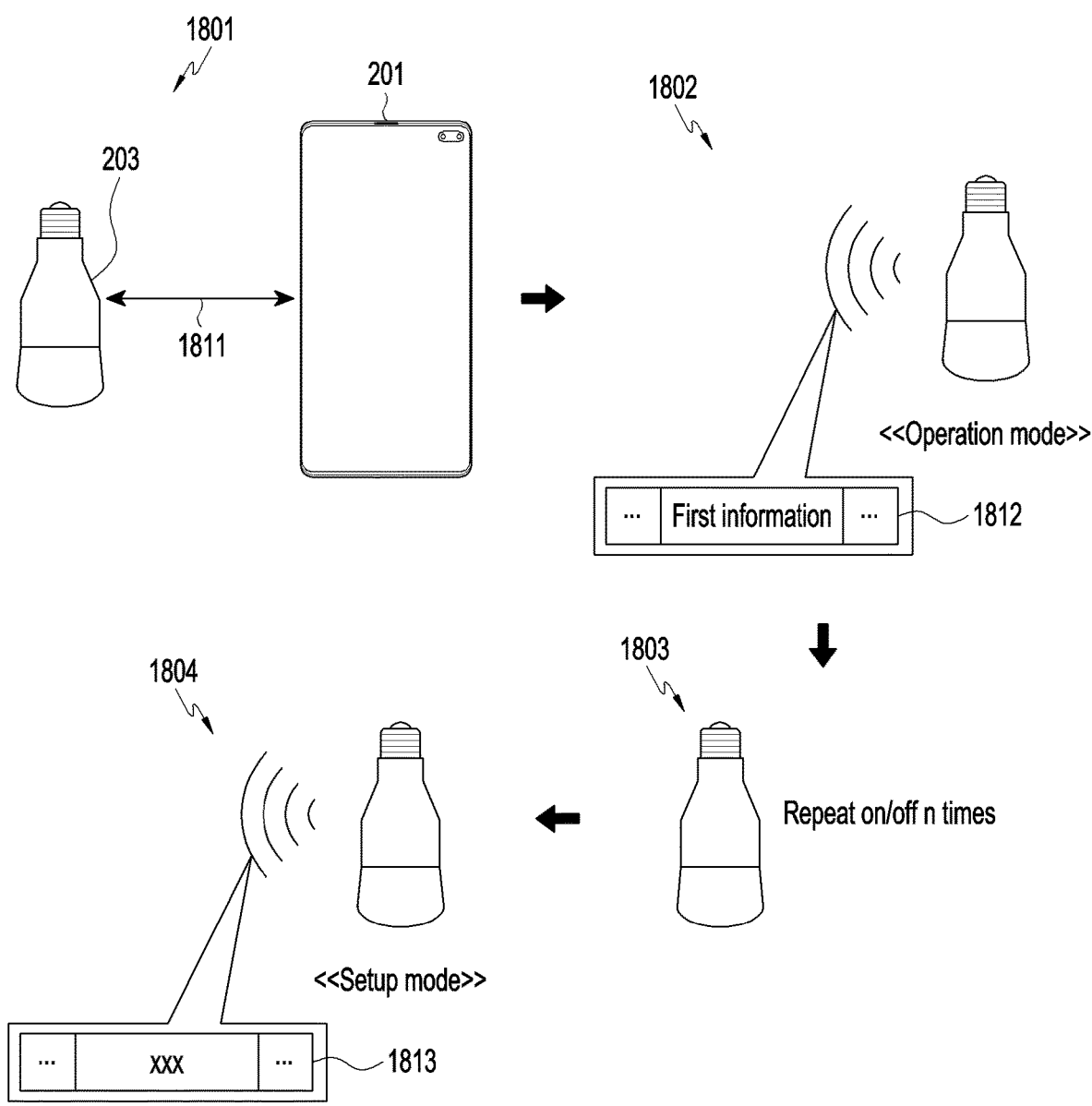
FIG. 18 is a diagram illustrating an example reset operation of a target device according to certain embodiments.

FIG. 18 is a diagram illustrating an example reset operation of the target device 203 according to certain embodiments.

According to certain embodiments, the target device 203 may periodically transmit a first signal in operation 1701, and perform pairing with a first electronic device located within a specified distance from the electronic device based on the transmission of the first signal in operation 1702. For example, the target device 203 may perform pairing 1811 with the electronic device based on the periodically transmitted first signal, as illustrated in 1801 of FIG. 18.

According to certain embodiments, the target device 203 may receive first information and second information for facilitating encrypted communication from the paired first electronic device in operation 1703, store the first information and/or the second information in operation 1704, and periodically transmit a second signal including the stored first information in operation 1705. For example, as illustrated in 1802 of FIG. 18, when storing the first information and/or the second information, the target device 203 may be set to the operation mode, and periodically transmit a second signal 1812 including the first information.

According to certain embodiments, the target device 203 may determine whether a specified condition is satisfied in operation 1706.

According to certain embodiments, when the target device 203 performs a specified operation, the specified condition may be determined to be satisfied. For example, the specified condition may be satisfied when the target device 203 performs a particular operation of which it is capable in a pre-indicated manner. For example, as illustrated in 1803 of FIG. 18, the specified operation may include detecting that the target device 203 is controlled to perform an operation (e.g., an on/off operation) related to a service provided by the target device 203 (e.g., a lighting function) a specified number of times during a specified time period. When the specified operation (e.g., on/off) of the target device 203 is performed the specified number of times, the target device 203 may identify that the specified condition is satisfied. In other words, satisfying the specified condition may amount to fulfilling a preset condition (e.g., on/off is changed a specified number of times during a specified time period) to achieve a characteristic value of a specific service of the target device 203 (e.g., a count of activations of the light).

According to certain embodiments, when the target device 203 performs a preset motion, the specified condition may be satisfied. For example, the target device 203 may identify a preset motion of the target device 203 (e.g., when the target device 203 is shaken upwards and downwards a specified number of times), using a sensor circuit provided to detect a motion made by the target device 203, and when the preset motion is detected, identify that the specified condition is satisfied.

According to certain embodiments, the target device 203 may delete the first information and/or the second information in operation 1707.

According to certain embodiments, when deleting the first information and/or the second information, the target device 203 may be reset from the operation mode to the setup mode. Accordingly, the target device 203 may periodically transmit a signal 1813 for notifying the existence of the target device 203 as illustrated in 1804 of FIG. 18, and the signal may not include the first information.

Another example operation of the system 200 according to certain embodiments will be described below. A redundant description related to the above-described system 200 will be omitted.

According to certain embodiments, an electronic device may compare a use record stored in the target device 203 with a use record stored in the server 204, associated with a specific account including the electronic device, and identify whether the target device 203 is controlled by an unauthorized user.

Figure 19:
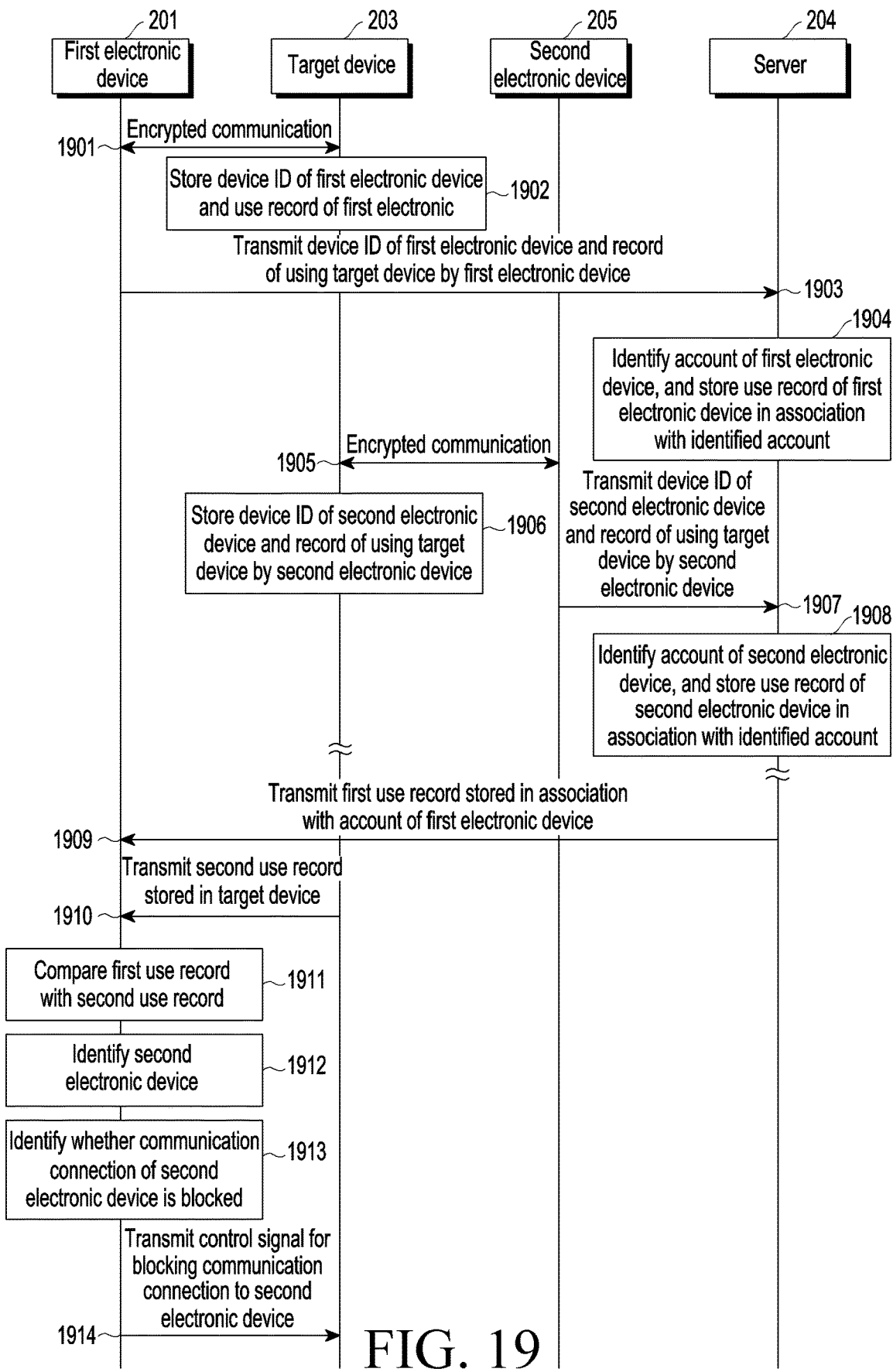
FIG. 19 is a flowchart illustrating another example operation of the system according to certain embodiments.

FIG. 19 is a flowchart illustrating another example operation of the system 200 according to certain embodiments. According to certain embodiments, the operations of the system 200 may be performed in an order different from the operation order of the system 200 illustrated in FIG. 19, not limited to the illustrated order. Further, according to certain embodiments, more operations than or at least one operation fewer than those of the system 200 illustrated in FIG. 19 may be performed. FIG. 19 will be described below with reference to FIG. 20.

Figure 20:
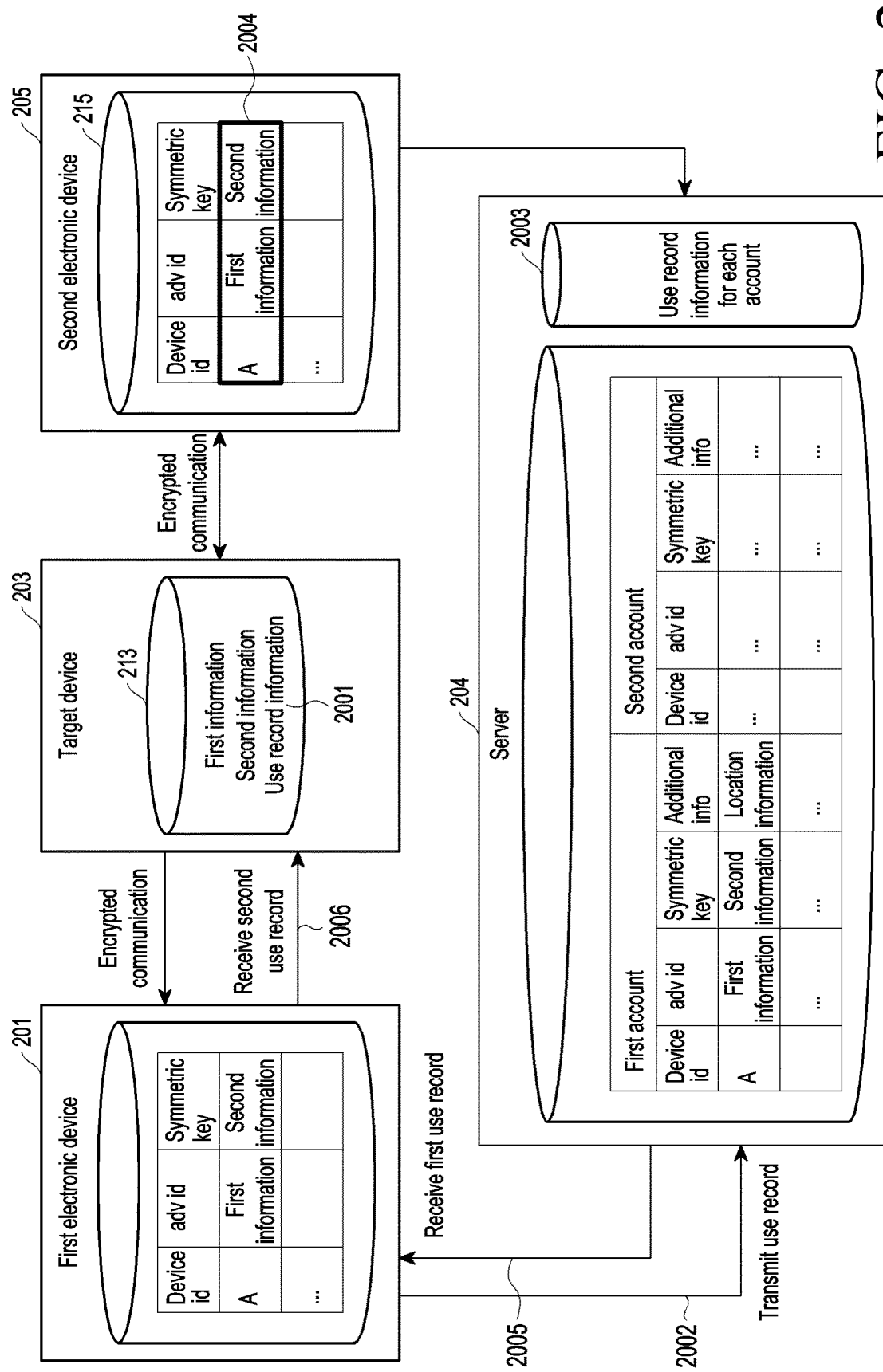
FIG. 20 is a diagram illustrating another example operation of the system according to certain embodiments.

FIG. 20 is a diagram illustrating another example operation of the system 200 according to certain embodiments.

According to certain embodiments, the first electronic device 201 may perform encrypted communication with the target device 203 in operation 1901. As illustrated in FIG. 20, the first electronic device 201 may transmit a device ID of the first electronic device 201 to the target device 203 through encrypted communication. However, the disclosure is not limited thereto, and the first electronic device 201 may perform various types of data transmission/reception methods such as pairing with the target device 203 as well as encrypted communication. Accordingly, the first electronic device 201 may transmit the device ID of the first electronic device 201 to the target device 203 according to various types of data transmission/reception schemes such as pairing.

According to certain embodiments, the target device 203 may store the device ID of the first electronic device 201 and a use record of the first electronic device 201 in operation 1902. For example, the target device 203 may identify information about a time period during which the first electronic device 201 is connected to the target device 203 in response to the encrypted communication with the first electronic device 201, and store the information about the identified time period in association with the received device ID of the first electronic device 201, as a use record 2001 of the first electronic device 201 in the memory 213, as illustrated in FIG. 20. Further, for example, the target device 203 may store information indicating whether the first electronic device 201 has connected to the target device 203 as the use record 2001 of the first electronic device 201. Further, for example, instead of storing the use record 2001 of the first electronic device 201, the target device 203 may simply store the device ID of the first electronic device 201 so that it may be identified whether the first electronic device 201 has used the target device 203. However, without being limited to the above description, the first electronic device 201 may perform various types of communication such as pairing with the target device 203 as well as encrypted communication. Accordingly, use record information may include information about a time period during which various types of data transmission/reception schemes have been used, such as information about pairing of the first electronic device 201 with the target device 203 as well as information about a time period during which the first electronic device 201 has performed encrypted communication with the target device 203.

According to certain embodiments, in operation 1903, the first electronic device 201 may transmit 2002 the device ID and use record of the first electronic device 201 as illustrated in FIG. 20. The first electronic device 201 may identify the information about the time period during which the first electronic device 201 has been connected to the target device 203 as the use record of the first electronic device 201, and transmit the identified use record and the device ID of the first electronic device to the server 204. The device ID and use record of the first electronic device 201 may be transmitted, when a specified condition is satisfied. The specified condition may include communication reconnection of the first electronic device 201 to the server 204, termination of communication with the target device 203 by the first electronic device 201, and reception of a request for a use record from the server 204 by the first electronic device 201. Since the use record of the first electronic device 201 has been described above in operation 1902, a redundant description will be omitted.

According to certain embodiments, in operation 1904, the server 204 may identify an account of the first electronic device 201 as illustrated in FIG. 20, and store 2003 the use record of the first electronic device 201 in association with the identified account. For example, the server 204 may identify a specific account (e.g., the first account) corresponding to the device ID of the first electronic device 201, and store the use record of the first electronic device 201 in association with the identified first account. In other words, the use record of the first electronic device 201 may be managed by the server 204 so that electronic devices included in the first account may access the use record.

According to certain embodiments, a second electronic device 205 may perform encrypted communication with the target device 203 in operation 1905. Since operation 1905 of the second electronic device 205 may be performed in the same manner as operation 1901 of the first electronic device 201, a redundant description will be omitted. However, the second electronic device 205 may be a device of a user unauthorized to control the target device 203. That is, as illustrated in FIG. 20, although the second electronic device 205 hijacks the first information and/or the second information registered in the first account including the first electronic device 201 by a predetermined method and store 2004 the information in a memory 215, the second electronic device 205 may not be included in the first account. In other words, although the second electronic device 205 may perform encrypted communication with the target device 203 based on the first information and/or the second information, the second electronic device 205 may not be an electronic device registered in the first account, which is capable of controlling the target device 203.

According to certain embodiments, the target device 203 may store a device ID and a use record of the second electronic device 205 in operation 1906. Since operation 1906 of the target device 203 may be performed in the same manner as operation 1902 of the target device 203, a redundant description will be omitted.

According to certain embodiments, as illustrated in FIG. 20, the second electronic device 205 may transmit the device ID and the use record of the second electronic device 205 in operation 1907, The server 204 may identify an account of the second electronic device 205 in operation 1908 and store the use record of the second electronic device 205 in association with the identified account. Operation 1907 of the second electronic device 205 may be performed in the same manner as operation 1903 of the first electronic device 201, and operation 1908 of the server 204 may be performed in the same manner as operation 1904 of the server 204. Therefore, a redundant description will be omitted.

According to certain embodiments, the first electronic device 201 may receive 2005 a first use record stored in association with the account of the first electronic device 201 from the server 204 in operation 1909, as illustrated in FIG. 20. For example, the first use record may include information about a time period during which the target device 203 has been used by each of the plurality of electronic devices included in the first account. In this case, the operation of receiving the first use record from the server 204 by the electronic device may be performed, when a specified condition is satisfied. For example, the satisfaction of the specified condition may include communication reconnection of the first electronic device 201 to the server 204, elapse of a specified time, or request for a use record to the server 204 by the first electronic device 201.

According to certain embodiments, the first electronic device 201 may receive 2006 a second use record stored in the target device 203 from the target device 203 in operation 1910, as illustrated in FIG. 20. For example, the second use record may include information about a time period during which the target device 203 has been connected to each of the plurality of electronic devices.

According to certain embodiments, the first electronic device 201 may compare the first use record with the second use record in operation 1911, and identify the second electronic device 205 in operation 1912. For example, the first electronic device 201 may compare electronic devices (e.g., the first electronic device 201, the second electronic device 205, and a third electronic device) connected to the target device 203 based on use records of the electronic devices (e.g., the first electronic device 201 and the third electronic device) included in the first account based on the first use record, and the second use record. The first electronic device 201 may identify from the second use record whether the target device 203 has been used by the second electronic device 205 not included in the first account, based on a result of the comparison.

According to certain embodiments, the first electronic device 201 may identify whether the communication connection of the second electronic device 205 has been prevented in operation 1913, and transmit a control signal to block the communication connection to the second electronic device 205 in operation 1914. The target device 203 may identify the second electronic device 205 and then prevent the second electronic device 205 from connecting to the target device 203, based on the control signal received from the first electronic device 201.

According to certain embodiments, the first electronic device 201 may control the display to display information about the identified second electronic device 205 in operation 1912. The first electronic device 201 may ask the user whether the user of the second electronic device 205 is authorized to use the target device 203, and determine whether the user of the second electronic device 205 is authorized to use the target device 203, according to a user input. For example, although the second electronic device 205 is not registered in the first account, the user of the second electronic device 205 may be authorized (e.g., the user of the second electronic device 205 is the user of the third electronic device originally registered in the first account). Therefore, the first electronic device 201 may inquire whether the user of the second electronic device 205 is authorized to use the target device 203 to prevent an authorized user from being excluded.

As described above, as the target device 203 manages information about devices using the target device 203, and the server 204 manages information about the devices using the target device 203 on an account basis, an unauthorized use of the target device 203 that is not capable of accessing the server 204 may be identified. In other words, it may be identified whether the target device 203 is used by an unauthorized user, and the unauthorized use may be stopped.

According to certain embodiments, an electronic device (e.g., 201) may include a communication circuit, a memory configured to store instructions, and at least one processor configured to execute the instructions stored in the memory. The instructions may be configured to cause the at least one processor to receive a first signal output from a first external device (e.g., 203) through the communication circuit, identify a mode of the first external device (e.g., 203) based on the received first signal, control the communication circuit to establish a connection with the first external device, based on identifying that a state of the first external device (e.g., 203) is a first mode, in response to the connection, generate first information to be included in a second signal to be periodically transmitted from the first external device which is in a second mode, and second information for encrypted communication with the first external device, and control the communication circuit to transmit the first information and the second information to the first external device and a second external device (e.g., 204) different from the first external device (e.g., 203).

According to certain embodiments, in the electronic device (e.g., 201), the instructions may be configured to cause the at least one processor to control the communication circuit to perform pairing with the first external device based on BLE communication, based on identifying that the state of the first external device is the first mode, and transmit the first information and the second information to the first external device and the second external device different from the first external device through encrypted communication based on the pairing.

According to certain embodiments, in the electronic device (e.g., 201), the instructions may be configured to cause the at least one processor to control the communication circuit to receive a second signal including the first information, output from the first external device (e.g., 203), after the pairing is released, connect to the first external device in response to the received second signal, and control the communication circuit to transmit a signal for controlling the connected first external device, based on the second information.

According to certain embodiments, in the electronic device (e.g., 201), the signal for controlling the first external device (e.g., 203) may be encrypted with the second information.

According to certain embodiments, in the electronic device (e.g., 201), the instructions may be configured to cause the at least one processor to control the communication circuit to transmit, to the second external device (e.g., 204), a message requesting registration of the first information and the second information.

According to certain embodiments, the electronic device (e.g., 201) may be included in a first account, and the first information and the second information may be registered in the first account based on the message such that the first information and the second information is capable of being provided to at least one device (e.g., 202) other than the electronic device (e.g., 201), included in the first account.

According to certain embodiments, in the electronic device (e.g., 201), the instructions may be configured to cause the at least one processor to control the communication circuit to transmit, to the second external device (e.g., 204), a first message requesting registration of the at least one device (e.g., 202) other than the electronic device (e.g., 201) in the first account.

According to certain embodiments, in the electronic device (e.g., 201), the instructions may be configured to cause the at least one processor to receive a third signal output from the first external device (e.g., 203), and generate third information to be included in a fourth signal to be periodically transmitted from the first external device (e.g., 203) and fourth information for encrypted communication with the first external device (e.g., 203) based on the received third signal, based on identifying that the state of the first external device (e.g., 203) is the first mode.

According to certain embodiments, in the electronic device (e.g., 201) may further include a display, and the instructions may be configured to cause the at least one processor to obtain a command for executing an application for providing the state of the first external device (e.g., 203), execute, based on the command, the application, and control the display to display an execution screen of the application, including at least one graphic element representing the state of the first external device (e.g., 203).

According to certain embodiments, in the electronic device (e.g., 201), the instructions may be configured to cause the at least one processor to control the communication circuit to receive a value indicating the state of the first external device from the first external device (e.g., 203), encode the value based on the second information, and update, based on the encoded value, the at least one graphic element representing the state of the first external device (e.g., 203) and control the display to display the updated at least one graphic element.

According to certain embodiments, an electronic device (e.g., 202) may include a communication circuit, a memory configured to store instructions, and at least one processor configured to execute the instructions stored in the memory. The instructions may be configured to cause the at least one processor to control the communication circuit to receive first information to be included in a signal to be periodically transmitted from a first external device (e.g., 203) and second information for encrypted communication with the first external device (e.g., 203), such that the first information and the second information may be generated in a second external device (e.g., 201) based on pairing between the first external device (e.g., 203) and the second external device (e.g., 201), receive a signal broadcast from the first external device (e.g., 203) through the communication circuit, control the communication circuit to connect to the first external device (e.g., 203) based on identifying the obtained signal including the first information, and control the communication circuit to transmit data to or receive data from the connected first external device (e.g., 203) based on the second information.

According to certain embodiments, in the electronic device (e.g., 202), the instructions may be configured to cause the at least one processor to control the communication circuit to transmit a message requesting the first information and the second information from a server, and control the communication circuit to receive the first information and the second information stored in the server (e.g., 204) from the server (e.g., 204).

According to certain embodiments, in the electronic device (e.g., 202), the first information and the second information may be allocated to a first account in the server (e.g., 204). The instructions may be configured to cause the at least one processor to control the communication circuit to receive the first information and the second information from the server (e.g., 204).

According to certain embodiments, in the electronic device (e.g., 202), the instructions may be configured to cause the at least one processor to perform scanning based on the first information, and when receiving the signal including the first information based on the scanning, identify that the first information is included in the obtained signal.

According to certain embodiments, an electronic device (e.g., 203) may include a memory configured to store instructions and at least one processor configured to execute the instructions stored in the memory. The instructions may be configured to cause the at least one processor to control the communication circuit to periodically transmit a first signal, control the communication circuit to connect the electronic device (e.g., 203) to a first external device (e.g., 201) based on the transmitted first signal, control the communication circuit to receive first information, and second information for encrypted communication from the paired first external device (e.g., 201), control the communication circuit to periodically transmit a second signal including the first information, based on receiving the first information and the second information, control the communication circuit to connect to a second external device (e.g., 202) based on the transmitted second signal, and control the communication circuit to transmit or receive data to or from the connected first external device (e.g., 201) based on the second information.

According to certain embodiments, in the electronic device (e.g., 203), the communication circuit may be provided to support short-range wireless communication and not to be capable of performing communication with at least one external device through a relay.

According to certain embodiments, in the electronic device (e.g., 203), the instructions may be configured to cause the at least one processor to control the communication circuit to transmit a third signal including a state value of the electronic device before receiving the first information and the second information, such that the state value included in the third signal is not encrypted, and control the communication circuit to transmit a fourth signal including a state value of the electronic device (e.g., 203) after receiving the first information and the second information, such that the state value included in the fourth signal may be encrypted based on the second information.

According to certain embodiments, in the electronic device (e.g., 203), the instructions may be configured to cause the at least one processor to store the first information and the second information, after receiving the first information and the second information, when a predetermined condition is satisfied, delete the stored first information and second information, and control the communication circuit to periodically transmit the first signal again.

According to certain embodiments, in the electronic device (e.g., 203), the instructions may be configured to cause the at least one processor to perform pairing again with the first external device (e.g., 201) located within a specified distance from the electronic device (e.g., 203), based on the first signal which is periodically transmitted again, and control the communication circuit to receive third information different from the first information and fourth information different from the second information from the first external device (e.g., 201).

According to certain embodiments, in the electronic device (e.g., 203), the instructions may be configured to cause the at least one processor to control the communication circuit to receive a message requesting communication from a second external device (e.g., 202), after receiving the first information and the second information, and when the second external device (e.g., 202) has not stored the first information, ignore the message received from the second external device (e.g., 202).

What is claimed is:

1. An electronic device, comprising:
   first communication circuitry;
   second communication circuitry;
   memory storing instructions; and
   at least one processor communicatively coupled to the first communication circuitry, the second communication circuitry and the memory,
   wherein the instructions are executable by the at least one processor to cause the electronic device to:
   receive a first signal from a first external device, via the first communication circuitry,
   identify a present mode of the first external device, based on the received first signal,
   control the first communication circuitry to establish a communicative connection with the first external device, based on identifying that the first external device is operating in a first mode,
   in response to establishing the connection, generate first information for inclusion in a second signal to be periodically transmitted from the first external device operating in a second mode, and second information for encrypting communications with the first external device,
   control the first communication circuitry to transmit the first information and the second information to the first external device, and
   transmit, via the first communication circuitry or the second communication circuitry, the first information and the second information to a second external device different from the first external device.

2. The electronic device of claim 1, wherein the instructions are further executable to cause the electronic device to:
   control the first communication circuitry to perform pairing with the first external device based on Bluetooth Low-Energy (BLE) communication, based on identifying that first external device is operating in the first mode, and
   wherein the first information and the second information transmitted to the first external device are encrypted, based on the pairing.

3. The electronic device of claim 1, wherein the instructions are further executable to cause the electronic device to:
   after the connection is released, receive via the first communication circuitry a second signal including the first information, from the first external device
   establish connection to the first external device in response to receiving the second signal, and
   transmit, via the first communication circuitry, a signal for controlling the connected first external device, based on the second information.

4. The electronic device of claim 3, wherein the signal for controlling the first external device is encrypted with the second information.

5. The electronic device of claim 1, wherein the instructions are further executable to cause the electronic device to:
   transmit, to the second external device, a first message requesting registration of the first information and the second information.

6. The electronic device of claim 5, wherein the electronic device is related to a first user account, and
   wherein the first information and the second information are registered to the first user account based on the transmitted first message, such that the first information and the second information is providable to at least one device registered to the first user account other than the electronic device.

7. The electronic device of claim 6, wherein the instructions are further executable to cause the electronic device to:
   transmit, to the second external device, a second message requesting registration of the at least one device other than the electronic device to the first user account.

8. The electronic device of claim 1, wherein the instructions are further executable to cause the electronic device to:
   receive a third signal that is output from the first external device, and
   generate third information for inclusion in a fourth signal to be periodically transmitted from the first external device, and fourth information for encrypting communications with the first external device based on the received third signal, after identifying that the first external device is operating in the first mode.

9. The electronic device of claim 1, further comprising a display,
   wherein the instructions are further executable to cause the electronic device to:
   based on receiving a command, executing an application providing a present mode of the first external device, and
   within the executed application, control the display to display an execution screen, including at least one graphic element representing the present mode of the first external device.

10. The electronic device of claim 9, wherein the instructions are further executable to cause the electronic device to:
receive a value indicating the present mode of the first external device from the first external device via the first communication circuitry,
encode the value based on the second information, and
based on the encoded value, update the at least one graphic element representing the present mode of the first external device, and control the display to display the updated at least one graphic element.

11. A method in an electronic device, comprising:
receiving a first signal from a first external device, via first communication circuitry;
identifying, via at least one processor, a present mode of the first external device, based on the received first signal;
establishing, via the first communication circuitry, a communicative connection with the first external device, based on identifying that the first external device is operating in a first mode;
in response to establishing the connection, generating, via the at least one processor, first information for inclusion in a second signal to be periodically transmitted from the first external device operating in a second mode, and second information for encrypting communications with the first external device; and
transmitting the first information and the second information to the first external device and to a second external device different from the first external device.

12. The method of claim 11, further comprising:
pairing with the first external device based on Bluetooth Low-Energy (BLE) communication, based on identifying that first external device is operating in the first mode,
wherein the first information and the second information transmitted to the first external device are encrypted, based on the pairing.

13. The method of claim 11, further comprising:
after the connection is released, receiving via the first communication circuitry a second signal including the first information, from the first external device
establishing connection to the first external device in response to receiving the second signal, and
transmitting, via the first communication circuitry, a signal for controlling the connected first external device, based on the second information.

14. The method of claim 13, wherein the signal for controlling the first external device is encrypted with the second information.

15. The method of claim 11, further comprising:
transmitting, to the second external device via the first communication circuitry or second communication circuitry, a first message requesting registration of the first information and the second information.

16. An electronic device, comprising:
first communication circuitry for communicating with a first external device within a certain range;
second communication circuitry for communicating with a server;
memory storing instructions; and
at least one processor communicatively coupled to the first communication circuitry, the second communication circuitry and the memory, wherein the instructions are executable by the at least one processor to cause the electronic device to:
receive a first signal from a first external device, via the first communication circuitry,
identify a present mode of the first external device, based on the received first signal,
in case that the first external device operates in a first mode:
transmit, via the first communication circuitry, first information related to a second signal to the first external device, and
transmit, via the second communication circuitry, the first information and second information to the server,
wherein the first information causes the first external device to operate in a second mode and to periodically transmit the second signal based on the first information in the second mode, and
wherein the second information allows another external device, upon receiving the second signal, to remotely control the first external device.

17. The electronic device of claim 16, wherein the instructions are further executable to cause the electronic device to:
control the first communication circuitry to perform pairing with the first external device based on Bluetooth Low-Energy (BLE) communication, based on identifying that first external device is operating in the first mode, and
wherein the first information and the second information transmitted to the first external device are encrypted, based on the pairing.

18. The electronic device of claim 16, wherein the instructions are further executable to cause the electronic device to:
after the connection is released, receive via the first communication circuitry a second signal including the first information, from the first external device
establish connection to the first external device in response to receiving the second signal, and
transmit, via the first communication circuitry, a signal for controlling the connected first external device, based on the second information.

19. The electronic device of claim 16, wherein the instructions are further executable to cause the electronic device to:
transmit, to the server, a first message requesting registration of the first information and the second information,
wherein the electronic device is related to a first user account, and
wherein the first information and the second information are registered to the first user account based on the transmitted first message, such that the first information and the second information are providable to at least one device registered to the first user account other than the electronic device.

20. The electronic device of claim 16, wherein the instructions are further executable to cause the electronic device to:
receive a value indicating the present mode of the first external device from the first external device via the first communication circuitry,
encode the value based on the second information, and
based on the encoded value, update at least one graphic element representing the present mode of the first external device, and display the updated at least one graphic element.

* * * * *